US008069074B2

(12) United States Patent
Toyofuku et al.

(10) Patent No.: US 8,069,074 B2
(45) Date of Patent: Nov. 29, 2011

(54) INFORMATION PROCESSING TERMINAL AND SERVER FOR SUPPORTING QUALITY IMPROVEMENT CONCERNING PRODUCT MANUFACTURE

(75) Inventors: Tsuyoshi Toyofuku, Kawasaki (JP); Tsunehiro Kosaka, Kawasaki (JP); Hideki Fujimura, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1328 days.

(21) Appl. No.: 11/638,692

(22) Filed: Dec. 14, 2006

(65) Prior Publication Data

US 2007/0192153 A1 Aug. 16, 2007

(30) Foreign Application Priority Data

Dec. 15, 2005 (JP) ................................ 2005-362221
Dec. 11, 2006 (JP) ................................ 2006-333710

(51) Int. Cl.
*G06Q 10/00* (2006.01)

(52) U.S. Cl. ..................... 705/7.27; 705/7.11; 705/7.12; 705/7.26; 700/97

(58) Field of Classification Search ........ 705/7.11–7.12, 705/7.26, 7.27; 700/97, 115; 715/273, 835, 715/866, 965, 967; 709/202, 203, 226, 238
See application file for complete search history.

(56) References Cited

U.S. PATENT DOCUMENTS 4,802,094 A * 1/1989 Nakamura et al. ............ 700/115
5,418,945 A * 5/1995 Carter et al. .......................... 1/1
5,455,903 A * 10/1995 Jolissaint et al. ............. 715/835
5,628,112 A * 5/1997 Maslar et al. ................... 29/846
5,630,069 A * 5/1997 Flores et al. ................. 705/7.27
5,768,506 A * 6/1998 Randell ......................... 709/202
5,774,661 A * 6/1998 Chatterjee et al. ............ 709/203
5,819,270 A * 10/1998 Malone et al. ........................ 1/1
5,822,585 A * 10/1998 Noble et al. .................. 719/316
5,930,512 A * 7/1999 Boden et al. .................. 717/102
5,937,388 A * 8/1999 Davis et al. ....................... 705/8
(Continued)

FOREIGN PATENT DOCUMENTS

EP 1 065 618 A2 1/2001
(Continued)

OTHER PUBLICATIONS

Tyson R. Browning "Process Integration Using the Design Structure Matrix" Systems Engineering, vol. 5, No. 3, 2002 Wiley Periodicals, Inc.*

(Continued)

*Primary Examiner* — Lynda Jasmin
*Assistant Examiner* — Alan S Miller
(74) *Attorney, Agent, or Firm* — Arent Fox LLP

(57) ABSTRACT

An information processing terminal for supporting quality improvement concerning product manufacture includes a workflow arrangement part acquiring row information indicating a first arrangement location of each of a plurality of workflows being arranged in an area for arranging the plurality of workflows for verifying the quality improvement, and displaying the plurality of workflows based on the row information; a process component arrangement part acquiring matrix information indicating a second arrangement location of each of a plurality of process components being arranged in each of the plurality of workflows, and displaying the plurality of process components based on the matrix information; and a data association part performing a data association among the plurality of process components in accordance with data link lines within each of the plurality of workflows or the data link lines crossing from one workflow to another workflow with respect to the plurality of process components arranged and displayed in the plurality of workflows.

11 Claims, 19 Drawing Sheets

U.S. PATENT DOCUMENTS

| | | | | |
|---|---|---|---|---|
| 6,026,365 | A * | 2/2000 | Hayashi | 705/7.26 |
| 6,073,109 | A * | 6/2000 | Flores et al. | 705/8 |
| 6,225,998 | B1 * | 5/2001 | Okita et al. | 715/853 |
| 6,243,092 | B1 * | 6/2001 | Okita et al. | 715/866 |
| 6,397,192 | B1 * | 5/2002 | Notani et al. | 705/9 |
| 6,697,784 | B2 * | 2/2004 | Bacon et al. | 705/9 |
| 6,810,294 | B2 * | 10/2004 | Rangachari et al. | 700/97 |
| 6,853,974 | B1 * | 2/2005 | Akifuji et al. | 705/9 |
| 6,859,676 | B1 * | 2/2005 | Kazemi | 700/110 |
| 6,889,375 | B1 * | 5/2005 | Chan et al. | 717/123 |
| 6,986,138 | B1 * | 1/2006 | Sakaguchi et al. | 718/105 |
| 7,065,493 | B1 * | 6/2006 | Homsi | 705/8 |
| 7,069,101 | B1 * | 6/2006 | Arackaparambil et al. | 700/121 |
| 7,130,709 | B2 * | 10/2006 | Popp et al. | 700/122 |
| 7,221,377 | B1 * | 5/2007 | Okita et al. | 345/629 |
| 7,242,991 | B2 * | 7/2007 | Budinger et al. | 700/95 |
| 7,296,103 | B1 * | 11/2007 | Purdy et al. | 710/106 |
| 7,433,801 | B2 * | 10/2008 | Walacavage et al. | 702/185 |
| 7,698,013 | B2 * | 4/2010 | Honda et al. | 700/116 |
| 7,844,910 | B2 * | 11/2010 | Shiraishi et al. | 715/763 |
| 2001/0038708 | A1 * | 11/2001 | Ishikawa et al. | 382/141 |
| 2003/0061266 | A1 * | 3/2003 | Ouchi | 709/106 |
| 2003/0150908 | A1 * | 8/2003 | Pokorny et al. | 235/375 |
| 2003/0181991 | A1 * | 9/2003 | Chau et al. | 700/1 |
| 2003/0195762 | A1 * | 10/2003 | Gleason et al. | 705/1 |
| 2003/0220707 | A1 * | 11/2003 | Budinger et al. | 700/97 |
| 2004/0078373 | A1 * | 4/2004 | Ghoneimy et al. | 707/10 |
| 2004/0083448 | A1 * | 4/2004 | Schulz et al. | 717/101 |
| 2004/0230941 | A1 * | 11/2004 | Marin et al. | 717/100 |
| 2005/0066304 | A1 * | 3/2005 | Tattrie et al. | 717/101 |
| 2005/0246215 | A1 * | 11/2005 | Rackham | 705/7 |
| 2006/0074736 | A1 * | 4/2006 | Shukla et al. | 705/8 |
| 2006/0173724 | A1 * | 8/2006 | Trefler et al. | 705/8 |
| 2007/0008584 | A1 * | 1/2007 | Kawabuchi et al. | 358/1.15 |
| 2007/0061358 | A1 * | 3/2007 | Brooks et al. | 707/103 R |
| 2007/0088583 | A1 * | 4/2007 | Chen et al. | 705/7 |
| 2007/0120736 | A1 * | 5/2007 | MacKenzie et al. | 342/357.07 |

FOREIGN PATENT DOCUMENTS

| | | | |
|---|---|---|---|
| JP | 2001-14389 | A | 1/2001 |
| JP | 2002-74253 | A | 3/2002 |
| JP | 2002-245215 | A | 8/2002 |
| JP | 2002-259643 | A | 9/2002 |
| JP | 2005-182635 | A | 7/2005 |

OTHER PUBLICATIONS

Goff et al. “From design to Production Control Through the Integration of Engineering Data Management and Workflow Management Systems” CMS Note 1997.*

Sun, Sherry; Zhao, Leon; and Sheng, Olivia, “Data Flow Modeling and Verification in Business Process Management” (2004). AMCIS 2004 Proceedings. Paper 508.*

* cited by examiner

31 BUSINESS FLOW seq NUMBER ① (EXTRACTION ENGINE) | ITEM B  *ITEM G* | seq NUMBER ⑥ (EXTRACTION ENGINE) | ITEM C  ITEM D | seq NUMBER ⑨ (EXTRACTION ENGINE) | ITEM E  ITEM F | seq NUMBER ⑬ (ASSOCIATED ENGINE) | ITEM B  ITEM C  ITEM D  ITEM E  ITEM F  *ITEM G* |

FIG.13

171 WORKFLOW DESIGN DATA

<table>
<tr><td><?xml version="1.0" encoding="UTF-8"></td><td></td></tr>
<tr><td><!DOCTYPE businessflow.save [</td><td></td></tr>
<tr><td><!ELEMENT businessflow (information|workflow*|link-set)></td><td>BUSINESS FLOW DEFINITION SET</td></tr>
<tr><td><!ATTLIST businessflow name CDATA #REQUIRED></td><td>DESCRIBE BUSINESS FLOW NAME</td></tr>
<tr><td><!ATTLIST businessflow rows CDATA #REQUIRED></td><td>DESCRIBE THE NUMBER OF ROWS IN BUSINESS FLOW EDIT AREA</td></tr>
<tr><td><!ATTLIST businessflow groupname CDATA #REQUIRED></td><td>DESCRIBE BUSINESS FLOW GROUP NAME</td></tr>
<tr><td><!ELEMENT information (author|date|comment|runtime)></td><td>ADDITIONAL INFORMATION WHEN SAVING FLOW</td></tr>
<tr><td><!ELEMENT author (#PCDATA)></td><td>DESCRIBE AUTHOR OF BUSINESS FLOW</td></tr>
<tr><td><!ELEMENT date (#PCDATA)></td><td>DESCRIBE UPDATED DATE OF BUSINESS FLOW<br>(yyyymmdd hhmmss FORMAT)</td></tr>
<tr><td><!ELEMENT comment (#PCDATA)></td><td>DESCRIBE COMMENT (EXPLANATION) OF BUSINESS FLOW</td></tr>
<tr><td><!ELEMENT runtime (#PCDATA)></td><td>DESCRIBE EXECUTION TIME hhmmss OF BUSINESS FLOW</td></tr>
<tr><td></td><td></td></tr>
<tr><td><!ELEMENT workflow (engine*)></td><td>WORKFLOW DEFINITION SET</td></tr>
<tr><td><!ATTLIST workflow name CDATA #REQUIRED></td><td>DESCRIBE WORKFLOW NAME</td></tr>
<tr><td><!ATTLIST workflow id CDATA #REQUIRED></td><td>DESCRIBE WORKFLOW ID</td></tr>
<tr><td><!ATTLIST workflow rows CDATA #REQUIRED></td><td>DESCRIBE THE NUMBER OF ROWS IN WORKFLOW EDIT AREA</td></tr>
<tr><td><!ATTLIST workflow cols CDATA #REQUIRED></td><td>DESCRIBE THE NUMBER OF COLUMNS IN WORKFLOW EDIT AREA</td></tr>
<tr><td><!ATTLIST workflow posy CDATA #REQUIRED></td><td>DESCRIBE ARRANGEMENT LOCATION OF WORKFLOW</td></tr>
<tr><td><!ATTLIST workflow runtime CDATA></td><td>DESCRIBE EXECUTION TIME hh:mm:ss OF WORKFLOW</td></tr>
<tr><td></td><td></td></tr>
<tr><td><!ELEMENT engine (setting*)></td><td>ENGINE DEFINITION SET</td></tr>
<tr><td>...............</td><td>...</td></tr>
<tr><td><!ATTLIST engine runtime CDATA></td><td>DESCRIBE EXECUTION TIME hhmmss OF ENGINE</td></tr>
<tr><td><!ELEMENT link-set (link*)></td><td>ENTIRE SET OF ENGINE LINK INFORMATION</td></tr>
<tr><td><!ELEMENT link (from|to)></td><td>ONE SET OF ENGINE LINK INFORMATION</td></tr>
<tr><td><!ELEMENT from (#PCDATA)></td><td>LINK ORIGINATOR ENGINE ID</td></tr>
<tr><td><!ELEMENT to (#PCDATA)></td><td>LINK DESTINATION ENGINE ID</td></tr>
<tr><td>]></td><td></td></tr>
<tr><td colspan="2">......<br>DESCRIPTION OF BUSINESS FLOW<br>......</td></tr>
</table>

FIG.14

```
<businessflow groupname="ANALYSIS FLOW" rows="5">                                  ⎫
<information>                                                                      ⎪
        <author>0099999</author>                                                   ⎪
        <date>20051114 131623</date>                                               ⎬ 301
        <comment>LINK EVALUATION BETWEEN AREA DIVISION AND MONITOR DATA</comment>  ⎪
        <runtime>00:00:36</runtime>                                                ⎪
</information>                                                                     ⎭

<workflow cols="4" id="workflow.21" name="WORKFLOW 21" fposy="0" rows="1"  } 320
runtime="00:00:13">
<engine breakpoint="false" endpoint="false" id="workflow.21/process.calculate.1" name="AGGRE  } 322
GATION 1" posx="2" posy="0" runtime="00:00:02" startpoint="false" type="process.calculate">
<setting type="calculate">                                          ⎫
        <calc-group>                                                ⎪
                <group-item type="number">WAFER</group-item>        ⎪
                <group-item type="chara">AREA_5</group-item>        ⎪
                <group-item type="chara">LOT</group-item>           ⎬ 322a
        </calc-group>                                               ⎪
        <calc-set>                                                  ⎪
                <calc-item calc="rate" detail="in" type="chara"     ⎪
                value="000">BIN</calc-item>                         ⎪
        </calc-set>                                                 ⎭
</setting>
<setting type="check"/> ~ 322b
</engine>

<engine breakpoint="false" endpoint="false" id="workflow.21/result.trend.1" name="TREND  } 323
1" posx="3" posy="0" runtime="00:00:03" startpoint="false" type="result.trend">
<setting type="trend-basic">                                        ⎫
        <x-axis>                                                    ⎪
                <item>LOT</item>                                    ⎪
                <display-order>alphabet</display-order>             ⎪
        </x-axis>                                                   ⎪
        <y-axis>                                                    ⎬ 323a
                <item>BIN_RATE_IN[000]</item>                       ⎪
                <logplot>                                           ⎪
                        <visible>false</visible>                    ⎪
                        <option>interrupt</option>                  ⎪
                </logplot>                                          ⎪
        </y-axis>                                                   ⎭
</setting>
<setting option="true" type="trend-classification"><class-set/></setting> ~ 323b
```

FROM FIG.14

```
<setting option="true" type="trend-graph-option">
        <assist-set>
                <spec>false</spec>
                <ctrl>false</ctrl>
                <target>false</target>
                <legend>true</legend>                         323c
        </assist-set>
        <value-set>
                <item-set>
                        <item>BIN_RATE_IN[000]</item>
                </item-set>
        </value-set>
</setting>
<setting option="true" type="trend-display-option">
        <font>MS GOTHIC</font>                                 323d
        <font-size>11</font-size>
</setting>
<setting option="true" type="display-tab"><tab-name/></setting>~ 323e
<setting type="check"/>~ 323f
</engine>

<engine breakpoint="false" endpoint="false" id="workflow.21/process.areadivide.1" name="
AREA DIVISION 1" posx="1" posy="0" runtime="00:00:06" startpoint="false"
 type="process.areadivide">
<setting type="areadivide"><divide type="area">5</divide></setting>~ 324a     324
<setting type="check"/>~ 324b
</engine>

<engine breakpoint="false" endpoint="false" id="workflow.21/extract.import.1" name="CSV
IMPORT 1" posx="0" posy="0" runtime="00:00:02" startpoint="false"
type="extract.import">
<setting type="import">                                                  325
        <name>d:¥map.csv</name>
        <incident>
                <item index="0">TP</item>
                <item index="1">PROCESS</item>
                <item index="2">ROUTE</item>
                <item index="3">LOT</item>
                <item index="4" type="number">WAFER</item>
                <item index="5" type="number">TEST_YIELD</item>        325a
                <item index="6" type="number">X</item>
                <item index="7" type="number">Y</item>
                <item index="8">BIN</item>
                <item index="9" type="number">PASS</item>
                <item index="10" type="number">WAFER_SIZE</item>
                <item index="11" type="number">CHIP_SIZE_X</item>
                <item index="12" type="number">CHIP_SIZE_Y</item>
        </incident>
</setting>
<setting type="check"/>~ 325b
</engine>
</workflow>
```

FROM FIG.15

```
<workflow cols="4" id="workflow.22" name="WORKFLOW 22" fposy="1" rows="2"   } 330
 runtime="00:00:06">

<engine breakpoint="false" endpoint="false" id="workflow.22/extract.monitordata.2" name="   } 332
MONITOR 1" posx="1" posy="0" runtime="00:00:02" startpoint="false"
type="extract.monitordata">

  WORKFLOW 22:SETTING OMISSION   } 332a

<setting type="check"/>
</engine>
</workflow>

<workflow cols="5" id="workflow.23" name="WORKFLOW 23" fposy="2" rows="2"   } 340
 runtime="00:00:15">
<engine breakpoint="false" endpoint="false" id="workflow.23/process.merge.2" name="MERGE   } 342
1" posx="3" posy="0" runtime="00:00:01" startpoint="false" type="process.merge">

  WORKFLOW 23:SETTING OMISSION   } 342a

<setting type="check"/>
</engine>
</workflow>

<workflow cols="5" id="workflow.24" name="WORKFLOW 24" fposy="3" rows="1"   } 350
 runtime="00:00:02">
<engine breakpoint="false" endpoint="false" id="workflow.24/result.xyplot.1" name="CORRELA   } 352
TION CHART 1" posx="4" posy="0" runtime="00:00:01" startpoint="false" type="result.xyplot">

  WORKFLOW 24:SETTING OMISSION   } 352a

<setting type="check"/>
</engine>
</workflow>

<link-set>   ~ 501
511 { <link>
        <from>workflow.21/process.areadivide.1</from>
        <to>workflow.21/process.calculate.1</to>
      </link>
512 { <link>
        <from>workflow.21/process.calculate.1</from>
        <to>workflow.21/result.trend.1</to>
      </link>
513 { <link>
        <from>workflow.21/extract.import.1</from>
        <to>workflow.21/process.areadivide.1</to>
      </link>
521 { <link>
        <from>workflow.22/extract.lot.1</from>
        <to>workflow.22/extract.monitordata.2</to>
      </link></setting>
```

FROM FIG.16

```
    <link>
522         <from>workflow.22/process.merge.3</from>
            <to>workflow.22/result.trend.2</to>
    </link>
    <link>
523         <from>workflow.22/result.trend.1</from>
            <to>workflow.22/result.export.1</to>
    </link>
    <link>
524         <from>workflow.22/extract.monitordata.2</from>
            <to>workflow.22/process.merge.3</to>
    </link>
    <link>
525         <from>workflow.22/extract.import.4</from>
            <to>workflow.22/process.merge.3</to>
    </link>
    <link>
526         <from>workflow.22/extract.monitordata.2</from>
            <to>workflow.22/result.trend.1</to>
    </link>
    <link>
527         <from>workflow.22/process.merge.3</from>
            <to>workflow.23/process.merge.2</to>
    </link>
    <link>
528         <from>workflow.21/process.calculate.1</from>
            <to>workflow.23/process.merge.2</to>
    </link>
    <link>
529         <from>workflow.23/process.merge.2</from>
            <to>workflow.23/result.trend.2</to>
    </link>
    <link>
530         <from>workflow.23/process.merge.2</from>
            <to>workflow.23/result.xyplot.1</to>
    </link>
    <link>
531         <from>workflow.22/extract.lot.1</from>
            <to>workflow.23/extract.processdata.1</to>
    </link>
    <link>
532         <from>workflow.24/process.merge.1</from>
            <to>workflow.24/result.xyplot.1</to>
    </link>
    <link>
533         <from>workflow.23/extract.processdata.1</from>
            <to>workflow.24/process.merge.1</to>
    </link>
    <link>
534         <from>workflow.23/process.merge.2</from>
            <to>workflow.24/process.merge.1</to>
    </link>
</link-set>

</businessflow>
```

INFORMATION PROCESSING TERMINAL AND SERVER FOR SUPPORTING QUALITY IMPROVEMENT CONCERNING PRODUCT MANUFACTURE

BACKGROUND OF THE INVENTION

1. Field of the Invention

The present invention generally relates to an information processing terminal and a server for supporting quality improvement concerning a product manufacture in which it is possible to design a workflow in accordance with a cognitive thought process of user to extract or process data, display a graph, or analyze statistics in order to verify the quality improvement concerning the product manufacture.

2. Description of the Related Art

Recently, in a highly developed semiconductor fabrication process, since the number of fabrication steps has been increased and each process operation technology becomes more complex, a conventional analysis system is required for a considerable amount of time. In addition, it is required to be skilled in order to effectively use various analysis functions of the conventional analysis system. Accordingly, a technical know-how of the quality improvement is simply accumulated to an individual user but is not accumulated to the conventional analysis system. Knowledge of effectively using the various functions depends on the individual user.

Conventionally, a management system for managing information in accordance with the fabrication process and an information system for analyzing in accordance with the quality improvement by an engineer are separated from each other. In addition, in the information system, system functions are fractioned corresponding to a subjective analysis basis such as analysis of defect data, analysis of a yield, and a like. No system has yet been suggested for a workflow in accordance with an actual engineer's cognitive thought process regarding the quality improvement.

In order to overcome the above-described problems, Japanese Laid-open Patent Application No. 2005-182635 discloses a technology to make a system for supporting an engineer to improve quality in accordance to the cognitive thought process of the engineer, so as to share analysis know-how with other engineers and effectively use an analysis result. This technology makes it possible to design workflows as analysis know-how of the engineers and design function menus to allow the engineers to conduct a drilldown analysis by a workflow design function and a repository function managing results of workflows and menus, so as to uniformly share the analysis know-how among the engineers.

However, in the technology described in the Japanese Laid-open Patent Application No. 2005-182635, it is limited to a fixed condition to interface between different engines (for example, each engine extracts a different data type, or performs a different graph function). Alternatively, the analysis result is verified, and the engineer is required to partially operate the workflow. Thus, this technology cannot achieve an automated drilldown analysis. In addition, there are workflows which cannot be combined because of a requirement caused by a filter function between engines in the workflow.

SUMMARY OF THE INVENTION

An embodiment of the present invention solves one or more of the above problems.

The present invention provides an information processing terminal for supporting quality improvement concerning product manufacture, including: a workflow arrangement part acquiring row information indicating a first arrangement location of each of a plurality of workflows being arranged in an area for arranging the plurality of workflows for verifying the quality improvement, and displaying the plurality of workflows based on the row information; a process component arrangement part acquiring matrix information indicating a second arrangement location of each of a plurality of process components being arranged in each of the plurality of workflows, and displaying the plurality of process components based on the matrix information; and a data association part performing a data association among the plurality of process components in accordance with data link lines within each of the plurality of workflows or the data link lines crossing from one workflow to another workflow with respect to the plurality of process components arranged and displayed in the plurality of workflows.

According to the present invention, in the information processing terminal, it is possible to associate an extraction condition and an analysis result among a plurality of engines (process components) in a workflow design and display the plurality of workflows and the plurality of engines (process components).

Moreover, the present invention may provide the information processing terminal as claimed in claim 1, wherein the row information of each of the plurality of workflows, the matrix information of each of the plurality of process components within the plurality of workflows, and data association information indicating each of the data associations among the plurality of process components are described in a metadata language for each business flow formed by the plurality of workflows and maintained in workflow design data.

According to the present invention, in the information processing terminal, it is possible to realize the workflow design in accordance with a cognitive thought process of an engineer as a user, by providing a condition branch and classification independent from a data type and an analysis engine so as to correspond to branches of the data association in various workflows.

The present invention includes an information processing terminal for executing a plurality of workflows in which process components are arranged, including: a control point management part acquiring an arrangement location of each of the process components in accordance with an execution order for executing the process components, and storing the control point in flow control data; and an execution control part controlling an execution of the process components which cross among the plurality of workflows by taking over items in accordance with workflow design data which defines data association among the process components when executing the process components by using the flow control data.

According to the present invention, in the information processing terminal, the extraction condition and the analysis result are associated among the plurality of engines as process components in the workflow design. Extraction, a filter condition, and the analysis result by the items are set for the engine as the process component, and data acquired by the items of the engine at a previous stage can be flexibly passed to a next engine as process component. Thus, a drilldown for linking following engines as process components can be automated.

The present invention provides a server for supporting quality improvement concerning a production manufacture, including: a workflow arrangement part acquiring row information indicating a first arrangement location of each of a plurality of workflows being arranged in an area for arranging the plurality of workflows for verifying the quality improvement, and displaying the plurality of workflows based on the row information; a process component arrangement part acquiring matrix information indicating a second arrangement location of each of a plurality of process components being arranged in each of the plurality of workflows, and displaying the plurality of process components based on the matrix information; a data association part performing a data association among the plurality of process components in accordance with data link lines within each of the plurality of workflows or the data link lines crossing from one workflow to another workflow with respect to the plurality of process components arranged and displayed in the plurality of workflows; and a sending part sending program data including a program functioning as the workflow arrangement part, the process component arrangement part, the data association part, and the execution part, to an information processing terminal connected through a network.

The present invention may provide a program product and a computer-readable recording medium recorded with a computer program for causing a computer to conduct processes described above in the information processing apparatus.

BRIEF DESCRIPTION OF THE DRAWINGS

Other objects, features and advantages of the present invention will become more apparent from the following detailed description when read in conjunction with the accompanying drawings, in which:

FIG. 13 is a diagram showing an example of XML descriptions in the workflow design data in which the business flow defined on the matrix in FIG. 11 is described in the XML, according to the embodiment of the present invention;

FIG. 14 is a diagram showing a description example of the workflows set to the business flow, according to the embodiment of the present invention;

FIG. 15 is a diagram showing the continued description example of the workflows set to the business flow, according to the embodiment of the present invention;

FIG. 16 is a diagram showing the continued description example of the workflows set to the business flow, according to the embodiment of the present invention;

FIG. 17 is a diagram showing the continued description example of the workflows set to the business flow, according to the embodiment of the present invention.

DESCRIPTION OF THE PREFERRED EMBODIMENT

An embodiment according to the present invention will be described with reference to the accompanying drawings.

Figure 1:
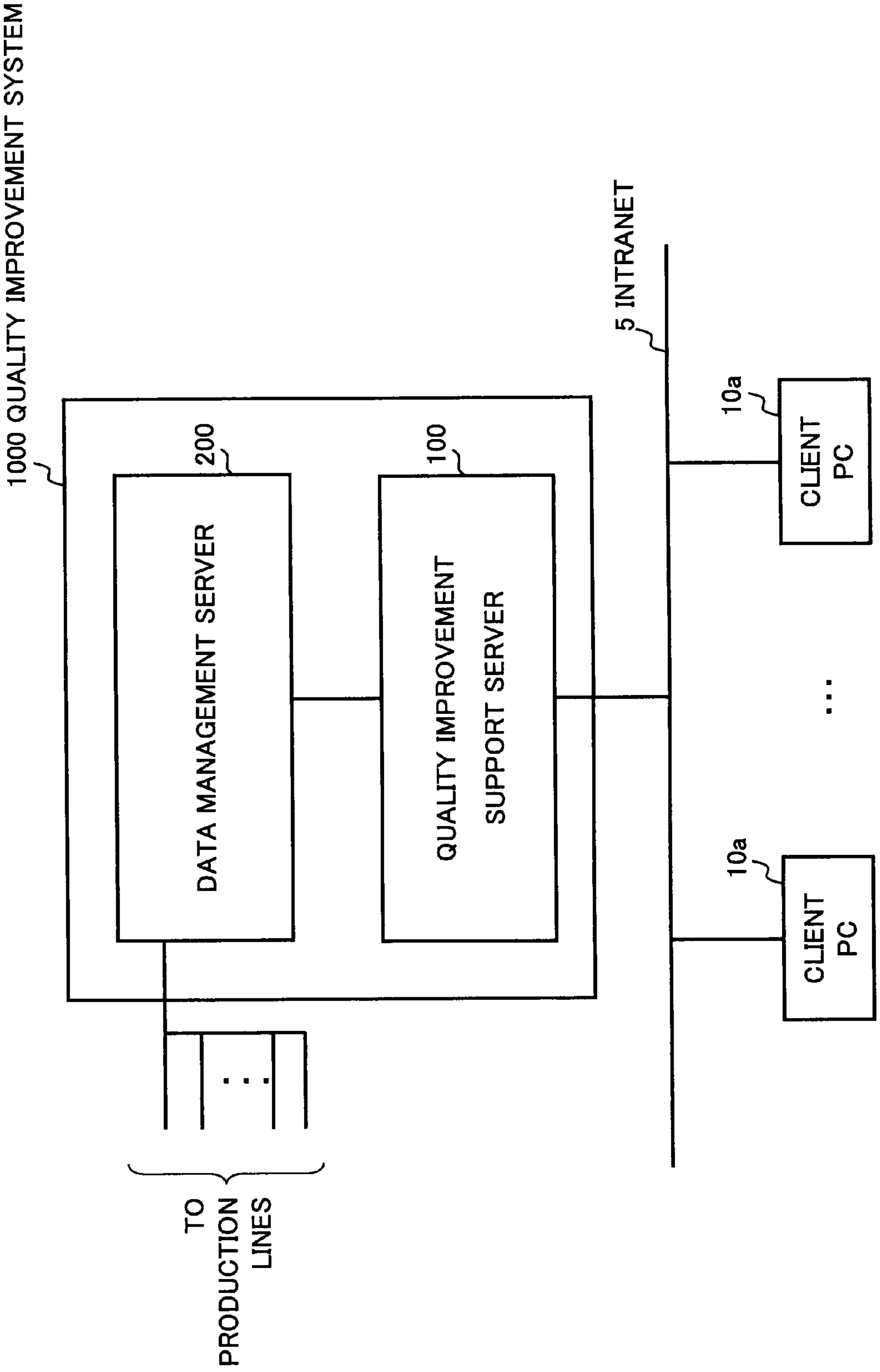
FIG. 1 is a block diagram showing a network configuration of a quality improvement system according to an embodiment of the present invention.

FIG. 1 is a block diagram showing a network configuration of a quality improvement system according to an embodiment of the present invention. In FIG. 1, the quality improvement system 1000 includes a quality improvement support server 100 and a data management server 200.

The quality improvement support server 100 sends data concerning a quality management to a client PC 10*a* and maintains workflows concerning the quality management used for a semiconductor fabrication in which the workflows are created and edited at the client PC 10*a*, in response to a request sent from the client PC 10*a* connected through the Intranet 5. Also, the quality improvement support server 100 analyzes problems based on an execution result, a state notice, and a like sent from the client PC 10*a* editing or executing the workflows, and sends an alarm to the client PC 10*a* if necessary.

For example, the data management server 200 is connected to production lines via respective dedicated lines, and periodically receives production data from the production lines. The quality improvement support server 100 conducts a data extraction with respect to the production data received from the production lines. After that, the production data are used to verify the quality improvement. Since a considerable amount of data are received from the production lines, a cluster structure may be formed to be flexibly enhanced for an increase of registration data.

Each of the clients PC 10*a* implements a Java™ environment, and creates, edits, and executes a business flow on a browser by activating a workflow creation program which is automatically downloaded from the quality improvement support server 100. When each user such as an engineer creates or edits the business flow while considering the business flow in his or her mind, computer resources of the client PC 10*a* is used for processes concerning the business flow. Accordingly, a workload of the quality improvement support server 100 can be distributed to each client PC 10*a* connected to the quality improvement system 1000 via the Intranet 5.

Figure 2:
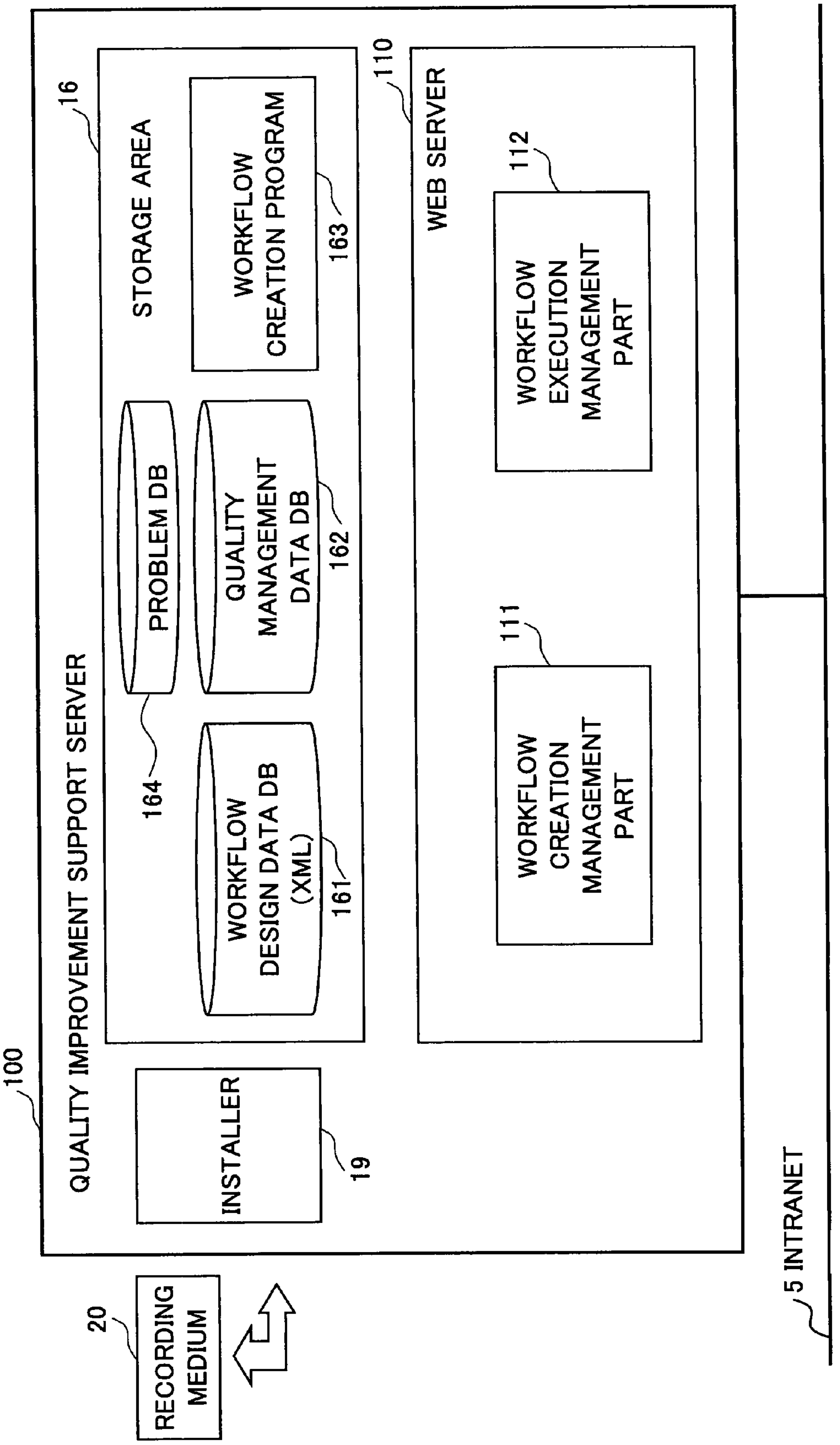
FIG. 2 is a block diagram showing a functional configuration of a quality improvement support server according to the embodiment of the present invention.

FIG. 2 is a block diagram showing a functional configuration of the quality improvement support server according to the embodiment of the present invention. In FIG. 2, the quality improvement server 100 is a server computer controlled by a CPU (Central Processing Unit), and includes at least a storage area 16, an installer 19, and a Web server 110.

The Web server 110 controls communications with a plurality of the clients PC 10*a* in accordance with an HTTP (HyperText Transfer Protocol), and includes a workflow creation management part 111 and a workflow execution management part 112. The Web server 110 checks a version of the workflow creation program 163*a* maintained in the client PC 10*a* when connecting to the client PC 10*a*, and sends a latest version of the workflow creation program 163*a* to the client PC 10*a* when the workflow creation program 163*a* of the client PC 10*a* needs to be updated.

The workflow creation management part 111 controls a request concerning a workflow creation from the client PC 10*a* via the Intranet 5. For example, the workflow creation management part 111 stores workflow design data created and instructed to be stored by the client PC 10*a*, in a workflow design data DB (Database) 161. Moreover, in response to a request of acquiring the workflow design data stored in the workflow design data DB 161, the workflow creation management part 111 retrieves the workflow design data which are requested from the client PC 10, from the workflow design data DB 161. Furthermore, the workflow creation management part 111 manages various requests which are made by the client PC 10 while the client PC 10*a* creates and edits the business flow including at least one workflow.

The workflow execution management part 112 receives the execution result or the state notice from the client PC 10*a* via the Intranet 5 while the client PC 10*a* are editing or executing the workflow, and conducts a process corresponding to the execution result or the state notice. For example, the workflow execution management part 112 performs a self-diagnosis with respect to a production process and a device problem. Then, the workflow execution management part 112 automatically acquires an instruction detail by searching for existing problem data (in which a problem pattern is verified) from the problem DB 164, and instructs the client PC 10*a* to overcome the problem. When a new problem occurs and cannot be maintained in the problem DB 164, the workflow execution management part 112 sends an alarm to the user.

The storage area 16 is an area in a storage unit such as a hard disk unit, and stores programs realizing various processes, and data and tables necessary for the CPU to conduct the processes. The storage area 16 stores at least the workflow design data DB 161, a quality management data DB 162, the workflow creation program 163, and the problem DB 164.

The workflow design data DB 161 stores data files in which data are described in XML (extensible Markup Language) received from the client PC 10*a*. A description method is not limited to the XML. Any metadata language can be applied in the description method. The quality management data DB 162 stores data concerning the production, which are extracted from the data management server 200.

The workflow creation program 163 is a latest program file available for the client PCs 10*a*. For example, the workflow creation program 163 is a Java™ application program or a like. The problem DB 164 accumulates problem information concerning a problem for which an overcoming method is defined and stored in a database, from problems informed from the client PCs 10*a*.

When a recording medium 20 storing a program realizing the process conducted by the quality improvement support server 100 is set to a driver, the installer 19 reads out the program from the recording medium 20, and installs into the storage unit. The CPU reads out and executes the program installed in the storage unit, so that the process is performed in the quality improvement support server 100. The recording medium is a computer-readable medium. For example, the recording medium may be a CD-ROM (Compact Disc Read-Only Memory) or a like. Alternatively, the program may be downloaded via a network, and installed in the storage unit.

The quality improvement support server 100 may further include an output control part for controlling a printer or a like to print out output data in response to an instruction from the CPU, an input control part for controlling input data input by a keyboard, a mouse, or a like, and a display control part for controlling a monitor or a like to display data.

Figure 3:
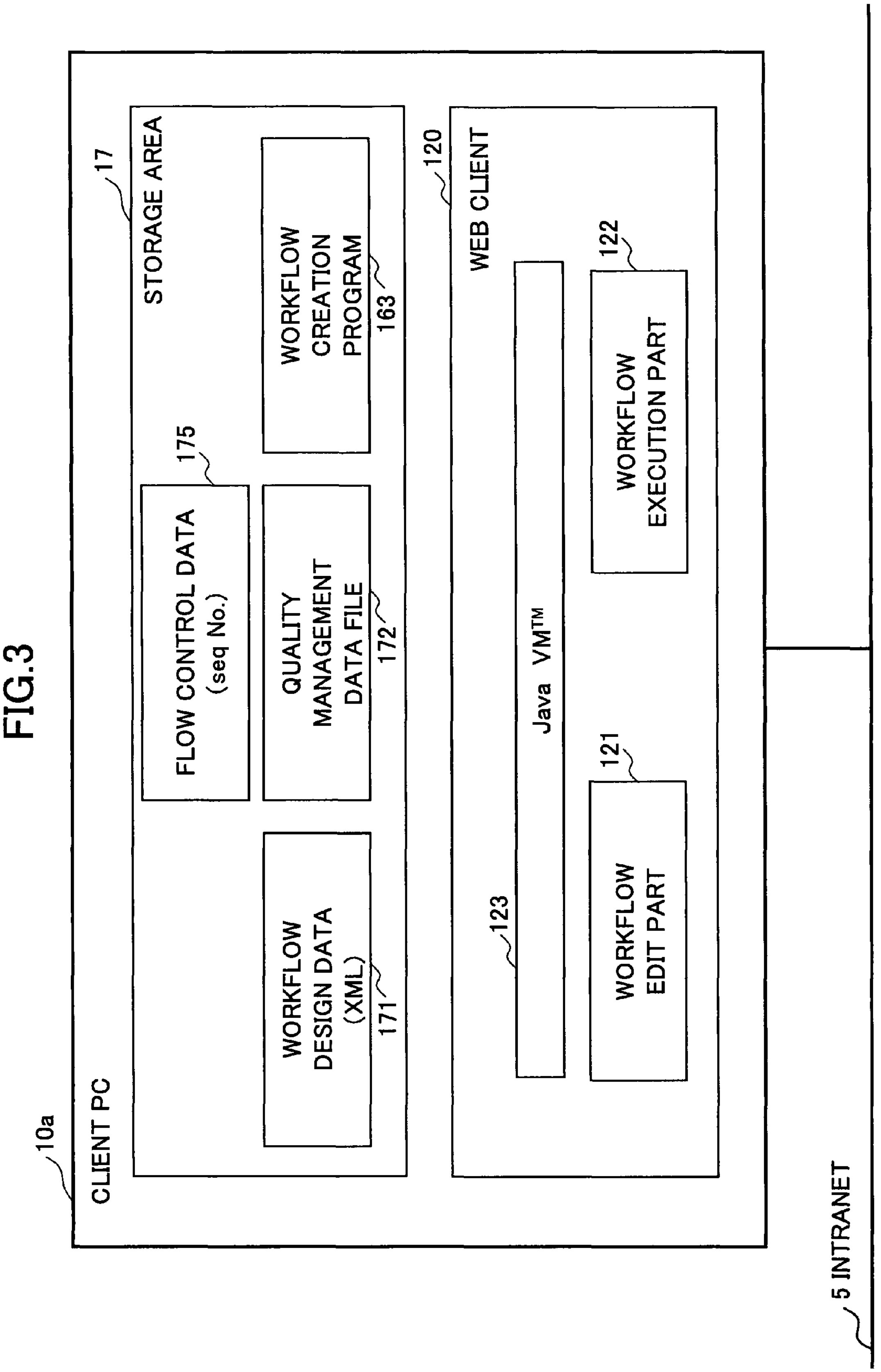
FIG. 3 is a diagram showing a functional configuration of a client PC according to the embodiment of the present invention.

FIG. 3 is a diagram showing a functional configuration of the client PC according to the embodiment of the present invention. In FIG. 3, the client PC 10*a* is a personal computer controlled by the CPU (Central Processing Unit), and at least a storage area 17, and a Web client 120.

The Web client 120 communicates with the quality improvement support server 100 in accordance with the HTTP (HyperText Transfer Protocol), and further includes a workflow edit part 121, a workflow execution part 122, and a Java™ VM (Virtual Machine) 123. For example, the workflow edit part 121 and the workflow execution part 122 are processing parts which are developed in a virtual storage area when the workflow creation program 163 is executed and becomes executable on the Java™ VM 123.

The workflow edit part 121 is a processing part which displays a screen on a browser as described later with reference to FIG. 4, and supports the user to create the business flow and each of workflows forming the business flow. Moreover, the workflow edit part 121 sends information indicating a state of an edit operation and a result to the quality improvement support server 100. Especially, when the information indicates a problem, the workflow edit part 121 sends an identification code for identifying problem a type which is defined in the program, data and an operation which cause the problem, and a like to the quality improvement support server 100, and displays an error notice as a response received from the quality improvement support server 100 for the user.

When the workflow edit part 121 ends to edit the workflows, an execution order in the business flow being created and edited is defined and sequential numbers (seq. no.) are issued. The execution order is stored for each business flow in flow control data 175. The execution order (seq. no.) is managed by the flow control data 175. Workflow design data 171 describing the business flow in the XML does not define the execution order.

The workflow execution part 122 executes the business flow created on the browser or each of workflows in accordance with the execution order (seq. no.) stored in the flow control data 175, in response to an execution instruction by the user. When the business flow or each of the workflows are executed, data extracted from the quality management data DB 162 of the quality improvement support server 100 are stored as a quality management data file 172 in the storage area.

Moreover, the workflow execution part 122 sends information indicating the state and the result by this execution to the quality improvement support server 100. Especially, when the information indicates a problem, the workflow execution part 122 sends the identification code for identifying the problem type defined in the program, data and an operation causing the problem, and a like to the quality improvement support server 100. The workflow execution part 122 displays the error notice as response received from an quality improvement support server 100 for the user.

When the workflow edit part 121 ends to edit the business flow and the workflows, the workflow execution part 122 ends to execute the business flow and the workflows, or the user instructs to store the business flow, the workflow design data

171 describing the business flow in the XML to the quality improvement support server 100.

The quality management data file 172 is extracted from the quality improvement support server 100 by executing the business flow being created by the workflow edit part 121 and is closely related to the production process. Also, the workflow design data 171 are closely related to the production process. Thus, the workflow design data 171 and the quality management data file 172 may be deleted from the storage area 17 after the workflow design data 171 is sent to the quality improvement support server 100.

The client PC 10*a* may further include an output control part for controlling a printer or a like to print out output data in response to an instruction from the CPU, an input control part for controlling input data input by a keyboard, a mouse, or a like, and a display control part for controlling a monitor or a like to display data.

In the present invention, the workflow is designed on a matrix. A workflow design will be described with reference to FIG. 4. FIG. 4 is a diagram for broadly explaining the workflow design according to the embodiment of the present invention. In the present invention, one matrix is created for one business flow. In one business flow, a plurality of workflows can be created. One row of the matrix is assigned to one workflow. A plurality of workflows are created on rows sequentially from a top row, and a basic order of the workflows is defined.

Figure 4:
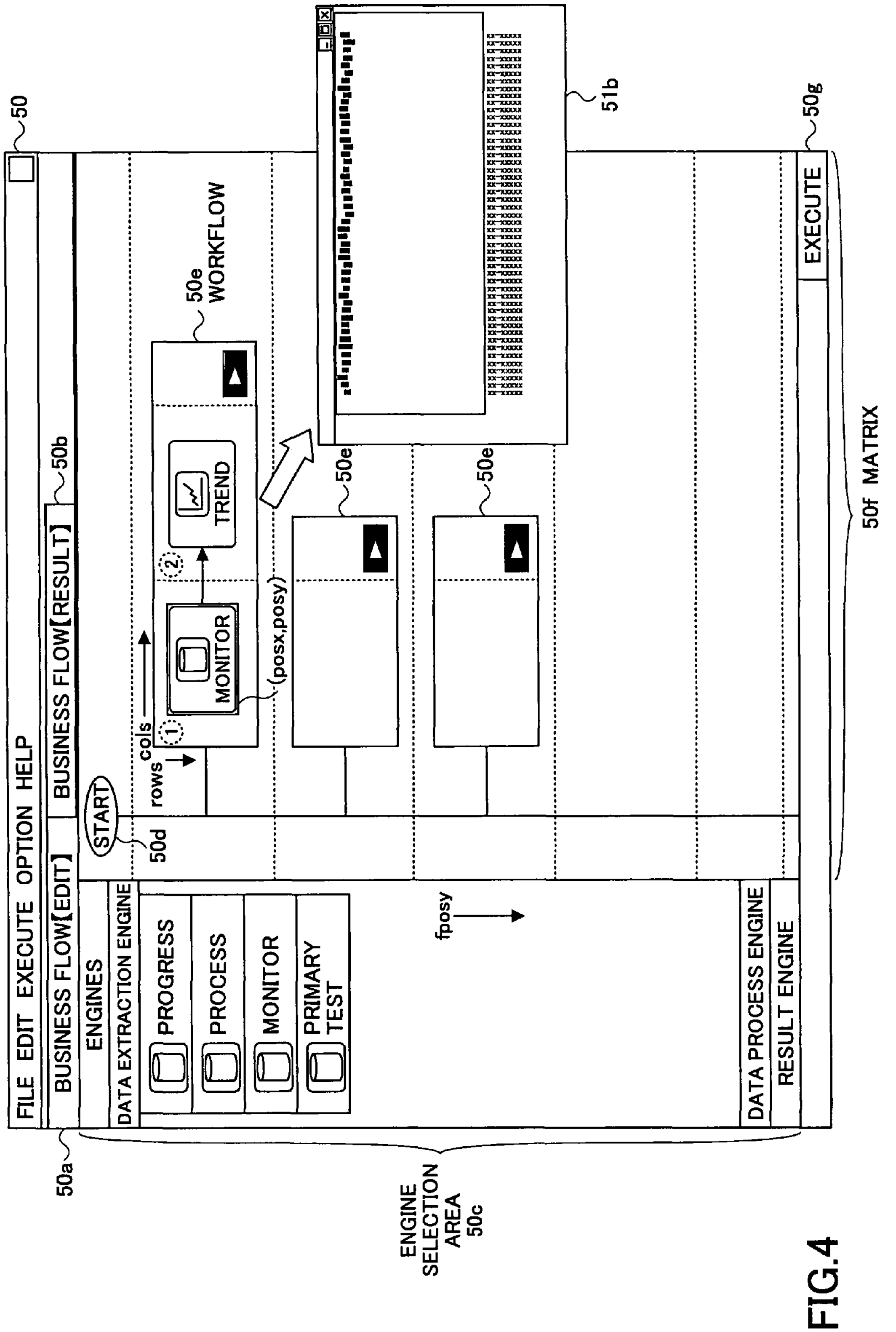
FIG. 4 is a diagram for broadly explaining a workflow design according to the embodiment of the present invention.

In a screen 50 shown in FIG. 4, a tag 50*a* and a tag 50*b* are created corresponding to two business flows. The user clicks and selects one of the tag 50*a* and the tag 50*b* by using a mouse or a like. The user creates each of workflows 50*e* on a matrix 50*f*, and arranges a desired engine in the workflow 50*e*. The tag 50*a* and the tag 50*b* corresponding to two business flows are maintained as one group of the business flows.

On the matrix 50*f*, a start of the business flow is indicated by a start mark 50*d*. An engine selection area 50*c* of the screen 50 shows engines which are classified for each category. For example, "ENGINES" listing all engines, "DATA EXTRACTION ENGINE", "DATA PROCESS ENGINE", and "RESULT ENGINE".

An icon for each engine is a program icon, and the user arranges the icon of the engine in a desired workflow 50*e* by an operation of drag and drop with the mouse.

The execution order (seq. no.) is issued corresponding to an arrangement location of the engine placed in the workflow 50*e* and stored in the flow control data 175. When the engine is deleted from the workflow 50*e* or added to the workflow 50*e*, the execution order (seq. no.) is re-issued with respect to all engines being arranged in the workflow 50*e*. In FIG. 4, each numeral circled by a dotted line is shown as the execution order (seq. no.).

The user arranges the engine in the workflow 50*e* in accordance with a user's cognitive thought process, and flexibly sets a flow of data among engines being arranged. The flow of data is set in a direction from left to right and can be set from an upper left engine to a lower right engine in one workflow 50*e*. Moreover, it is possible to set the flow of data from an upper left engine to a lower right engine so as to straddle from one workflow 50*e* to another workflow 50*e* in the matrix 50*f*.

The workflow edit part 121 of the client PC 10*a* maintains the location of each of the workflows 50*e* which are arranged by the user, with a variable "fposy" (integer equal to or greater than zero). Also, the workflow edit part 121 maintains the location of each of the engines which are arranged in each of the workflows 50*e*, with a location coordinate (posx, posy) (integers equal to or greater than zero). The workflow 50*e* is sectioned into a plurality of cells in one row and multiple rows such as two rows, three rows . . . may be formed in the workflow 50*e*. A size of the workflow 50*e* is maintained by a variable "rows" and a variable "cols". A matrix configuration for each business flow will be described later with reference to description examples shown in FIG. 14 through FIG. 17.

In addition, the execution order (seq. no.) of the engines is issued and defined in accordance with a predetermined rule from left to right and from upper to lower in the matrix 50*f*. At least, the execution order (seq. no) is corresponded to the location coordinate (posx, posy) for each set of information for identifying the business flow, and is stored in the flow control data 175.

As described above, the user executes and verifies the workflow 50*e* while creating the workflow 50*e*. The user selects the workflow 50*e* and clicks an execution button 50*g*, so as to verify the workflow 50*e* while reviewing an execution result. For example, the execution result may be displayed at a screen 51*b*.

Figure 5:
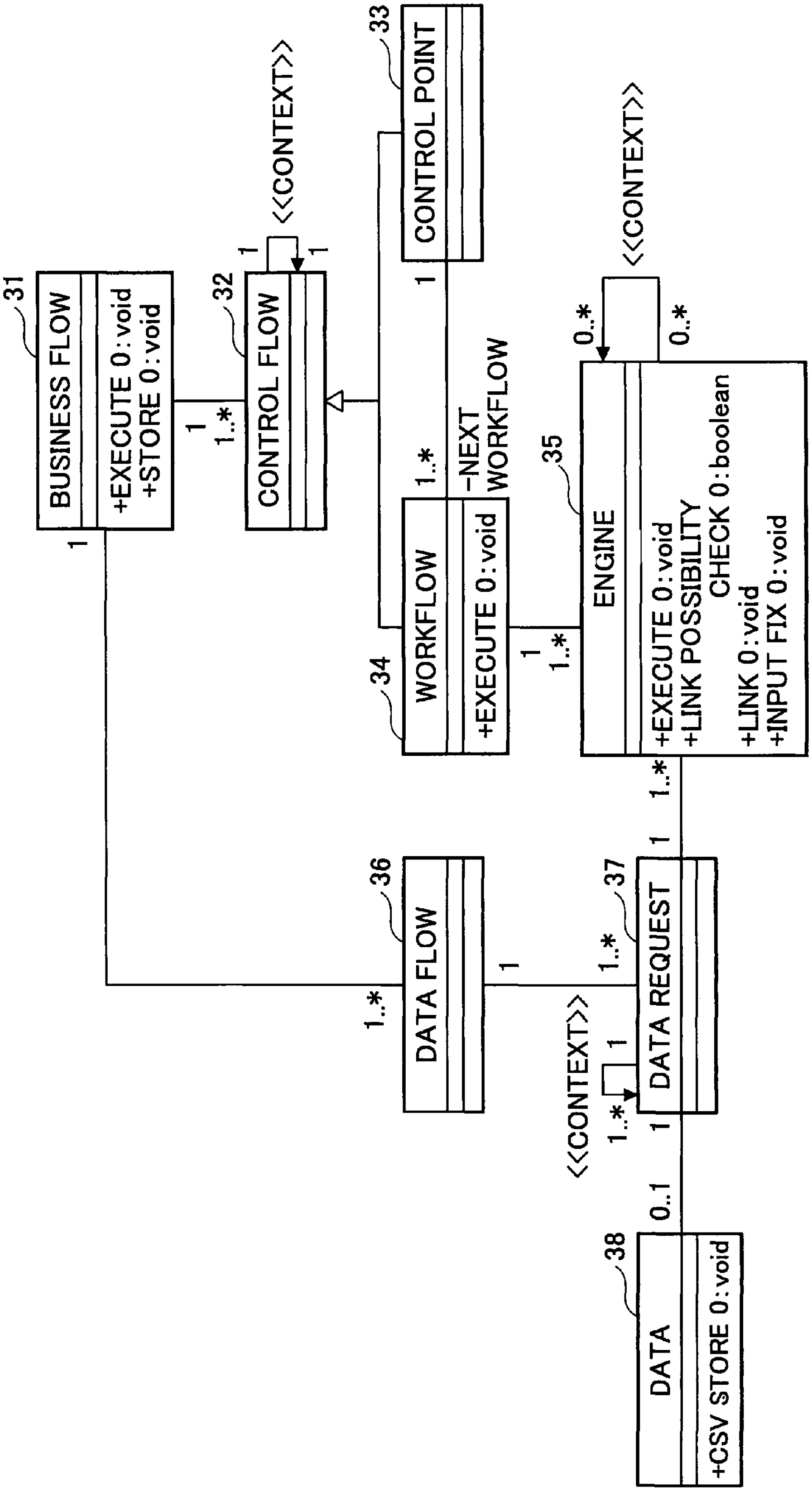
FIG. 5 is a diagram illustrating a software design diagram indicating object relationships, according to the embodiment of the present invention.

The workflow creation program 163 downloaded from the quality improvement support server 100 to the client PC 10*a* is an object oriented program based on the software design diagram. FIG. 5 is a diagram illustrating a software design diagram indicating object relationships, according to the embodiment of the present invention. In FIG. 5, the workflow creation program 163 includes a business flow 31, a control flow 32, a control point 33, a workflow 34, an engine 35, a data flow 36, a data request 37, and data 38 as classes.

For example, the business flow 31 executes the business flows 50*a* and 50*b* in FIG. 4, and stores the business flows 50*a* and 50*b*. The business flow 31 is related to one or more control flows 32 and one or more data flows 36.

The control flow 32 maintains a context of the workflow 34 (for example, workflow 50*e* created on the matrix 50*f*) by corresponding to workflow identification information identifying the workflow 34. The control flow 32 always belongs to one business flow 31.

The control point 33 maintains a pointer toward a next workflow 34 which takes over a process. The control point 33 maintains one or more workflows 34. Moreover, the control point 33 issues the execution order (seq. no.) of the engine 35 in accordance with the predetermined rule from left to right and from upper to lower, based on the location coordinate of the engine 35 in the business flow which is formed by one or more workflows 34. The execution order (seq. no.) issued by the control point 33 is stored and maintained in the flow control data 175. The control point 33 re-issues the execution order (seq. no.) in accordance with the predetermined rule based on the location coordinate of the engine 35, and stores and manages in the flow control data 175, when the engine 35 is added or deleted.

The workflow 34 includes zero or more engines 35, and executes the process of the engines 35 by transferring data among the engines 35.

The engine 35 executes a predetermined process, checks whether or not there is a condition setting capable of be linked in a plurality of condition settings as candidates, links to a next engine to be executed, and fixes inputs. The engine 35 maintains a context among a plurality of condition settings. The engine 35 always belongs to one workflow 34, and is always related to one data request 37.

The data flow 36 is generated by fixing the inputs for each engine 35, and always belongs to one business flow 31. Moreover, the data flow 36 is related to one or more data request 37.

The data request 37 is related to zero or one object of the data 38, and stores data if necessary. The data 38 always belongs to one data request 37.

In accordance with the software design diagram, the engine 35 conducts data process, and the workflow 34 forms the engine 35 in a single process flow group. Furthermore, the business flow 31 forms a plurality of workflows 34 to be a single sequential flow. Three process layers are formed by the engine 35, the workflow 34, and the business flow 31.

On the screen 50 shown in FIG. 4, it is possible to read and maintain arrangements of the engines 35, links among the engines 35, and contexts in links of the workflows 50*e* (that is, an arrangement relationship in the matrix 50*f*), which are flexibly conducted by the user. Accordingly, it is possible to normalize an order of flexible input-output settings.

Moreover, the data requests 37 made by a single engine 35 are maintained by the business flow 31, and an order of the data requests 37 is similarly normalized.

The control flow 32 defines an order and links of the workflows 34 (workflow 50*e* in FIG. 4). The engines 35 mutually define the link.

Figure 6:
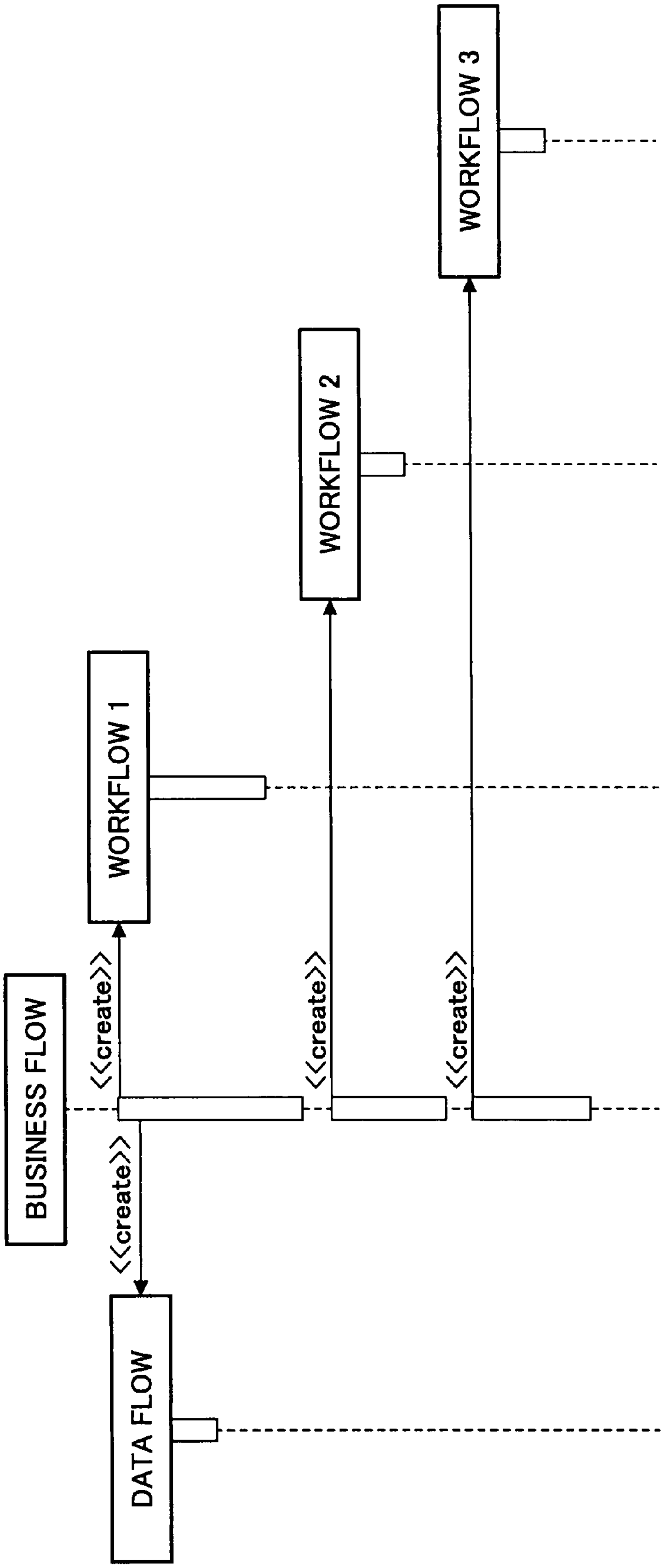
FIG. 6 is a sequence diagram for creating the workflow and a data flow according to the embodiment of the present invention.

FIG. 6 is a sequence diagram for creating the workflow and the data flow according to the embodiment of the present invention. In FIG. 6, in accordance with the control point 33 and the order being normalized by the control flow 32 in FIG. 5, the workflow 34 is generated one by one from the business flow 31, and is executed. In this case, the data flow 36 is generated by referring to the workflow 34 to which the data flow 36 belongs.

Figure 7:
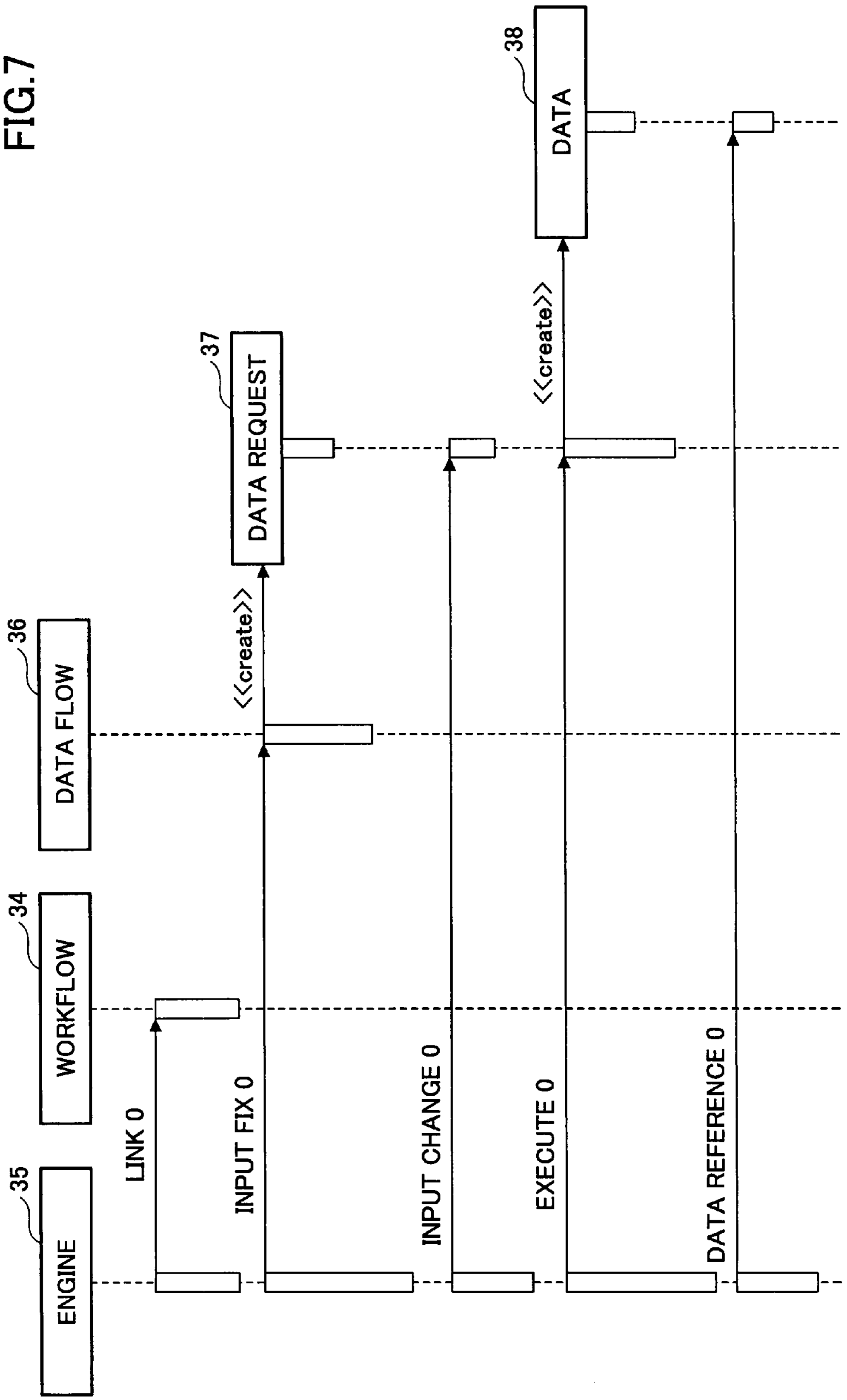
FIG. 7 is a diagram showing a process sequence in which an engine is linked, a request is input to the engine, and the engine executes the process, according to the embodiment of the present invention.

FIG. 7 is a diagram showing a process sequence in which the engine is linked, a request is input to the engine, and the engine executes the process, according to the embodiment of the present invention. In FIG. 7, when the engine 35 belongs to the workflow 34 and the input of the request of the data process is fixed, the data flow 36 is generated and the data process in the workflow 34 is fixed.

When the request is changed and a change content is fixed, the data process is fixed. After the data process of the engine 35 is fixed and the data request 37 is generated, data is extracted and processed by executing the data request 37, so that the data 38 are generated. After the engine 35 executes the process of the data request 37, the data can be referred to.

Figure 8:
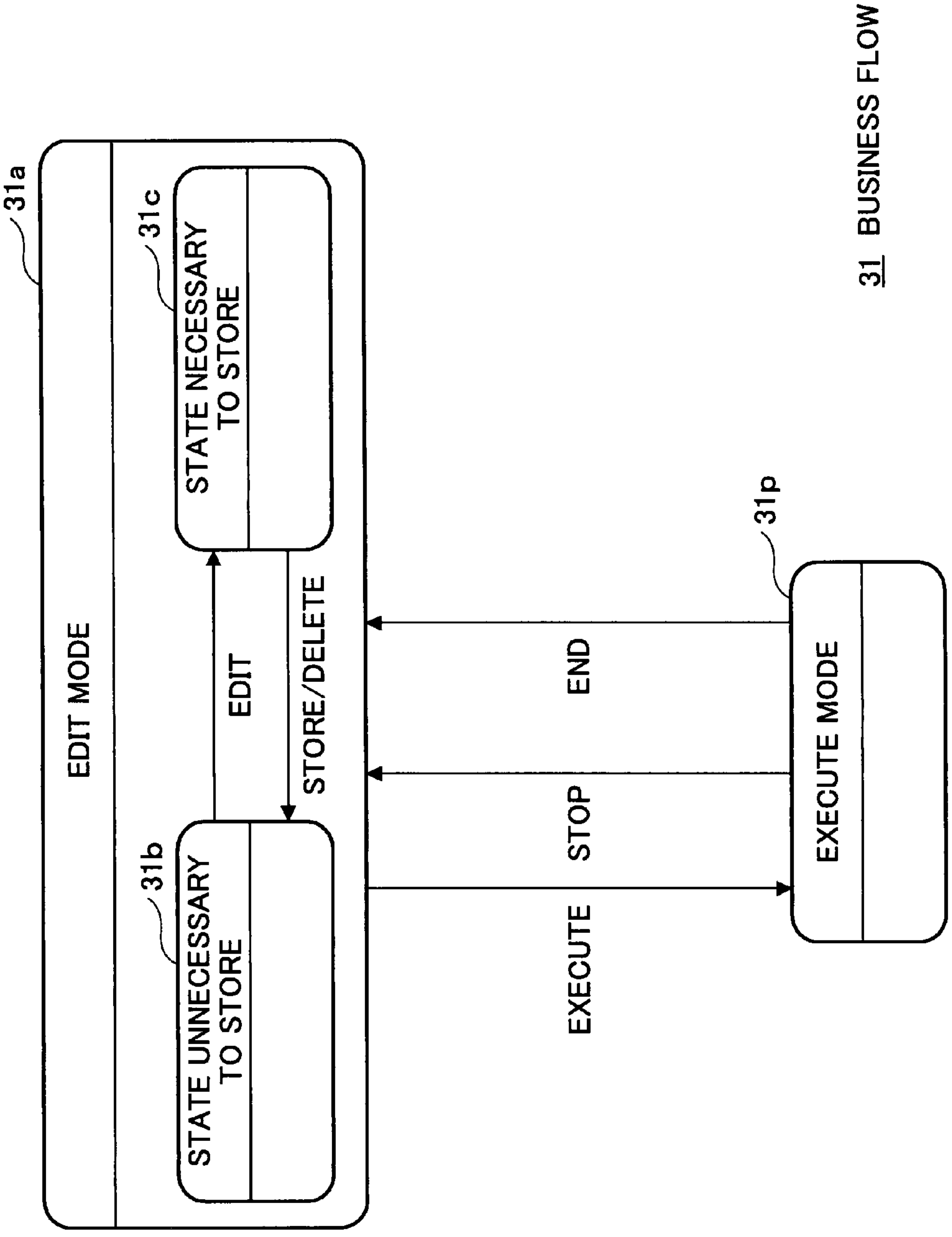
FIG. 8 is a flowchart to store and execute a business flow according to the embodiment of the present invention.

FIG. 8 is a flowchart to store and execute the business flow according to the embodiment of the present invention. In FIG. 8, as states of the business flow 31, there are an edit mode 31*a* for storing the business flow and an execution mode 31*p* for executing the business flow. By maintaining the states of the business flow, it is possible to maintain processes to store and execute the business flow without interfering the processes with each other.

The edit mode 31*a* has a state 31*b* unnecessary to store the business flow 31 in which the business flow 31 is not necessary to be stored, and a state 31*c* necessary to store the business flow 31 in which the business flow 31 is necessary to be stored. In the state 31*b* unnecessary to store the business flow 31, when the business flow 31 is began to be edited in response to an operation of the user, the edit mode 31*a* transits to the state 31*c* necessary to store the business flow 31. When the engine 35, the workflow 34, or the business flow 31 is stored or deleted in response to the operation of the user, the edit mode 31*a* transits to the state 31*b* unnecessary to store the business flow 31.

After the engine 35, the workflow 34, or the business flow 31 is stored or deleted in response to the operation of the user, when the edit mode 31*a* becomes the state 31*b* unnecessary to store the business flow 31, the control point 33 (FIG. 5) issues the execution order (seq. no.), and stores and maintains the execution order (seq. no.) in the flow control data 175.

In response to an execution operation by the user, the edit mode 31*a* is changed to the execution mode 31*p*. The execution mode 31*p* executes the entire workflow 34 or the business flow 31 indicated by the user in accordance with the execution order (seq. no.) stored in the flow control data 175. The execution mode 31*p* is changed to the edit mode 31*a* when the execution is stopped or finished.

Figure 9:
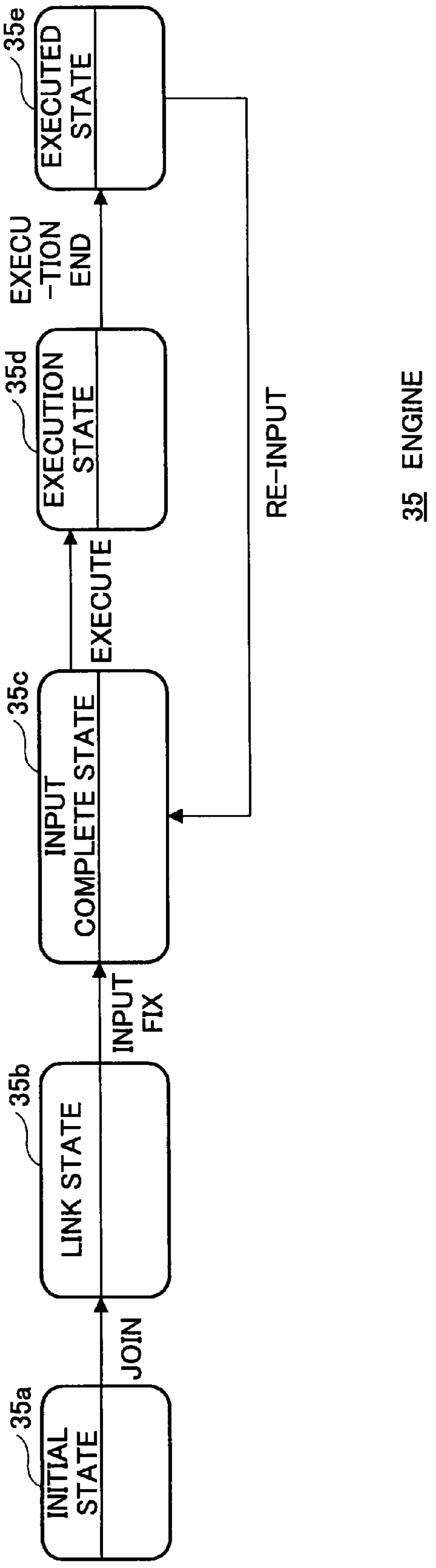
FIG. 9 is a diagram showing a chart of a process flow of the engine according to the embodiment of the present invention.

FIG. 9 is a diagram showing a chart of the process flow of the engine according to the embodiment of the present invention. In FIG. 9, the engine 35 has a initial state 35*a*, a link state 35*b*, a link state 35*b*, an input complete state 35*c*, an execution state 35*d*, and an executed state 35*e*. The initial state 35*a* and a state belonging to the workflow 34 (such as the link state 35*b*) are distinguished, a condition input is maintained, and an execution is started in a state in which a condition is fixed (such as the input completed state 35*c*). Then, the engine 35 transits to the execution state 35*d*. After the execution is completed (the executed state 35*e*), if the condition is re-input, the engine 35 transits back to the input complete state 35*c*.

In the input complete state 35*c*, the control point 33 (FIG. 5) issues the execution order (seq. no.) in response to an input completion, and the execution order (seq. no.) is stored in the flow control data 175 (FIG. 3). The engine 35 transits to the execution state 35*d* when the execution of the engine 35 is started in accordance with the execution order (seq. no.) stored in the flow control data 175.

In the executed state 35*e*, when the control flow 32 (FIG. 5) refers to the flow control data 175 and detects the executed state 35*e* in which the execution of the engine 35 is completed, the control flow 32 processes a following engine 35 to be a next execution order (seq. no.).

Figure 10:
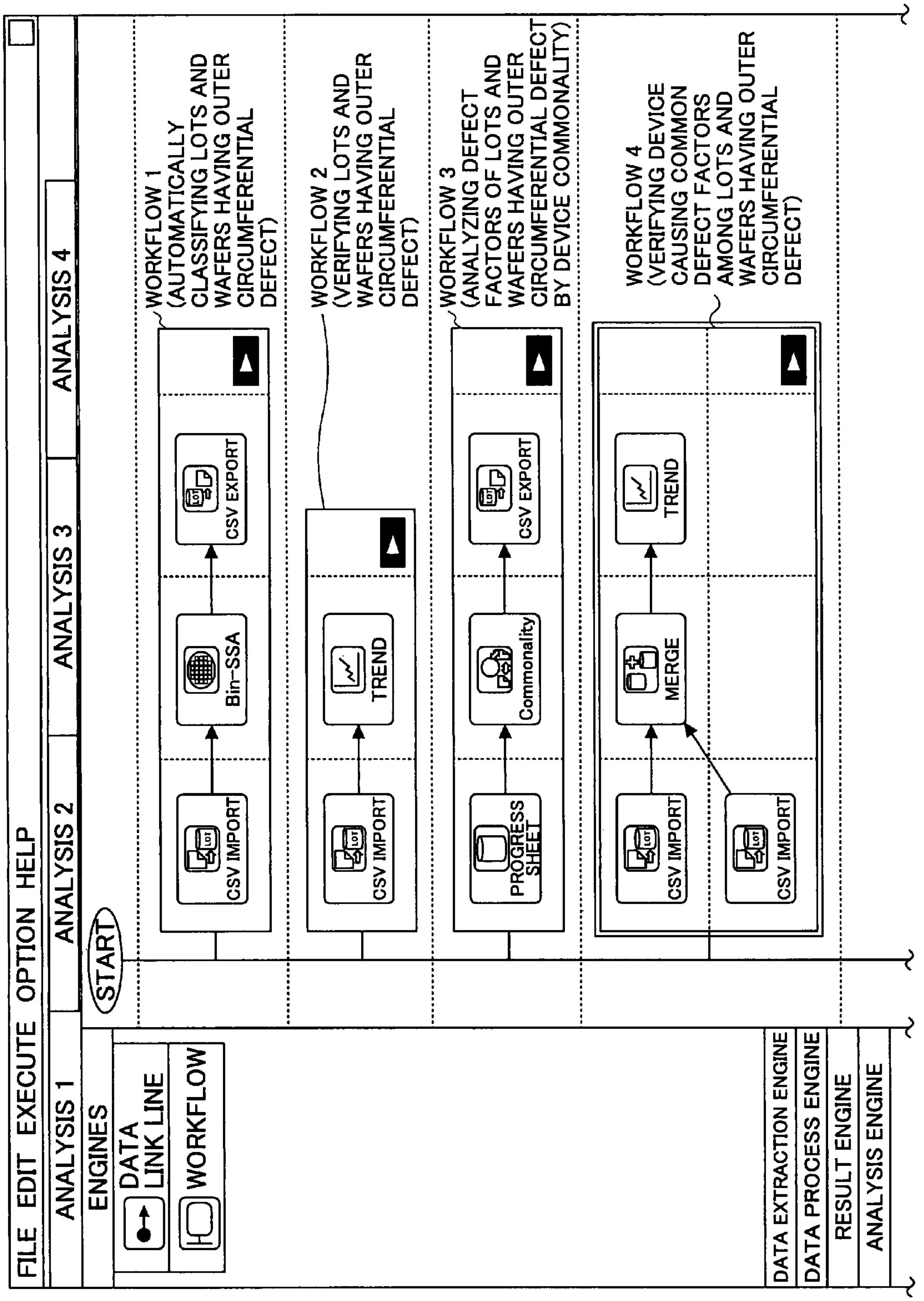
FIG. 10 is a diagram showing a first example of the workflow design of a matrix according to the embodiment of the present invention.

FIG. 10 is a diagram showing a first example of the workflow design of the matrix according to the embodiment of the present invention. In the first example of the workflow shown in FIG. 10, each of four workflows 1, 2, 3, and 4 is defined in a lateral direction, and four workflows 1 through 4 are arranged in sequence in a longitudinal direction. A plurality of workflows 1, 2, 3, 4 . . . are sequentially maintained in the longitudinal direction.

In the workflow 1, lots and wafers having an outer circumferential defect are automatically classified by a "CSV IMPORT" engine, a "Bin-SSA" engine, a "CSV EXPORT" engine. In the workflow 2, the lots and wafers having the outer circumferential defect are verified by a "CSV IMPORT" engine and a "TREND" engine. In the workflow 3, defect factors of the lots and wafers having the outer circumferential defect are analyzed by device commonality by a "PROGRESS SHEET" engine, a "Commonality" engine, and a "CSV EXPORT" engine. In the workflow 4, a device causing common defect factors among the lots and the wafers having the outer circumferential defect are verified by a "CSV IMPORT" engine, a "MERGE" engine, a "TREND" engine, and a "CSV IMPORT" engine.

Figure 11:
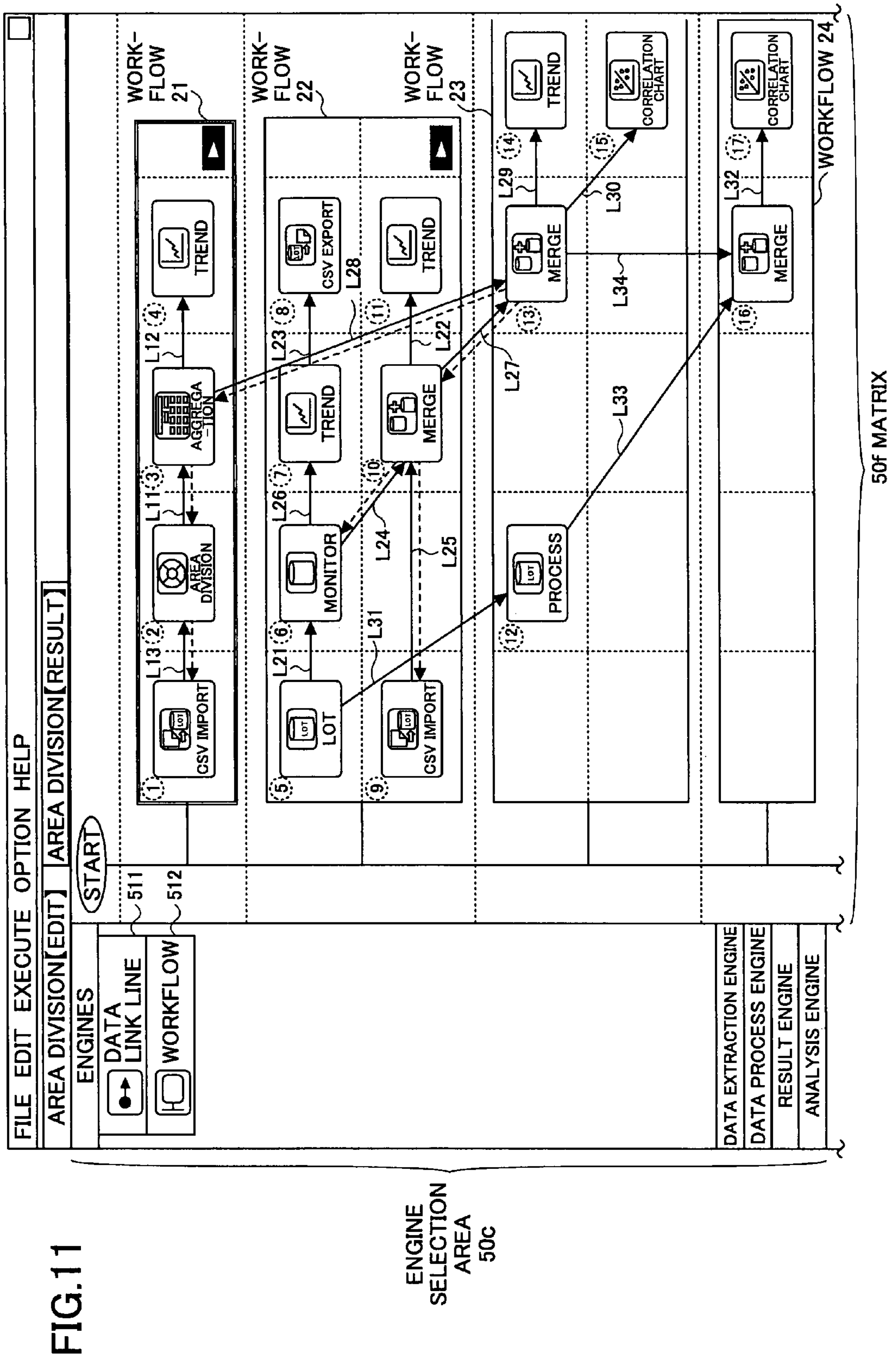
FIG. 11 is a diagram showing a second example of the workflow design of the matrix according to the embodiment of the present invention.

FIG. 11 is a diagram showing a second example of the workflow design of the matrix according to the embodiment of the present invention. In the second example of the workflow design shown in FIG. 11, similar to the first example, each of four workflows 21, 22, 23, and 24 is defined in the lateral direction, and four workflows 21 through 24 are arranged in sequence in the longitudinal direction. A plurality of workflows 21, 22, 23, 24 . . . are sequentially maintained in the longitudinal direction. However, in the second example, there are links associating with engines of other workflows.

A "AGGREGATION" engine in the workflow 21 is associated with a "MERGE" engine in the workflow 23 by a data link line L28 crossing over the workflow 22. Moreover, a "LOT" engine in the workflow 22 is associated with a "PROCESS" engine by a data link line L31, and the "MERGE"

engine in the workflow 22 is associated with a "MERGE" engine in the workflow 23 by a data link line L27.

The "PROCESS" engine in the workflow 23 is associated with the "MERGE" engine in the workflow 24 by the data link line L33. The "MERGE" engine in the workflow 23 is further associated with another "MERGE" engine in the workflow 24 by a data link line L34.

Moreover, a "MONITOR" engine in the workflow 22 is associated with the "MERGE" engine in the same workflow 22 by a data link line L24.

Furthermore, items for the "MERGE" engine in the workflow 23 are determined items acquired by the data link line L23 from the "AGGREGATION" engine in the workflow 21 and items acquired by the data link line L27 from the "MERGE" engine in the workflow 22. The items for the "MERGE" engine in the workflow 23 realizes the data associations toward a "TREND" engine in the workflow 23 by a data link line L29, a "CORRELATION CHART" engine in the workflow 23 by a data link line L30, and further the "MERGE" engine in the workflow 24 by the data link line L34.

In the workflows 21 through 24 arranged in the matrix 50*f*, the user select a category "ENGINES" from an engine selection area 50*c*, and places a program icon 512 showing "WORKFLOW" being classified to the category "ENGINES" to an arrangement location which the user determines based on the cognitive thought process, by the drag and drop operation.

Moreover, data link line L11 through L34 set in the matrix 50*f* are placed when the user selects the category "ENGINES" from the engine selection area 50*c* and places a program icon 511 showing "DATA LINK LINE" classified to the category "ENGINES" to arrangement locations which the user determines based on the cognitive thought process, by the drag and drop operation.

In the second example of the workflow design of the matrix 50*f* shown in FIG. 11, the sequential number 1 through 17 in the execution order are issued in accordance with the predetermined rule from left to right and from upper to lower. In FIG. 11, the sequential number 1 through 17 in the execution order are shown as numerals circled by a dotted line.

By selecting each program icon of engines, the user can add or delete items of a selected engine. Accordingly, in a case of an associated engine (for example, the "MERGE" engine of the sequential number 13) being associated from two or more engines, an item inconsistency may occur. In order to execute the business flow shown in FIG. 11, the item inconsistency is eliminated as shown in FIG. 12A and FIG. 12B.

A method for eliminating the item inconsistency will be described with reference to FIG. 12A and FIG. 12B. In FIG. 12A and FIG. 12B, an extraction engine is an engine which is other than the association engine being linked from two or more engines and extracts data corresponding to items set by the user from the quality management data file 172.

Figure 12A:
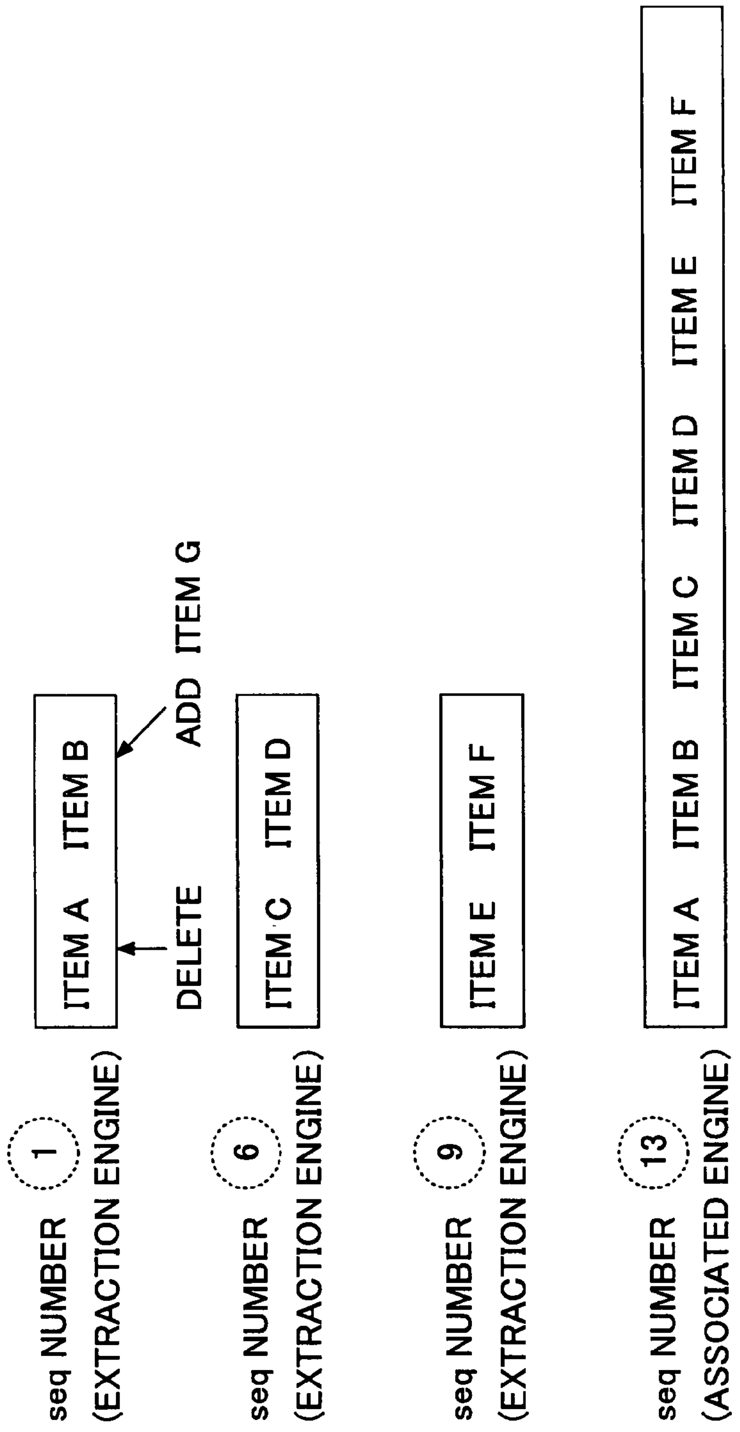
FIG. 12A is a conceptual diagram showing items set to the engine when the workflow is designed, according to the embodiment of the present invention.
Figure 12B:
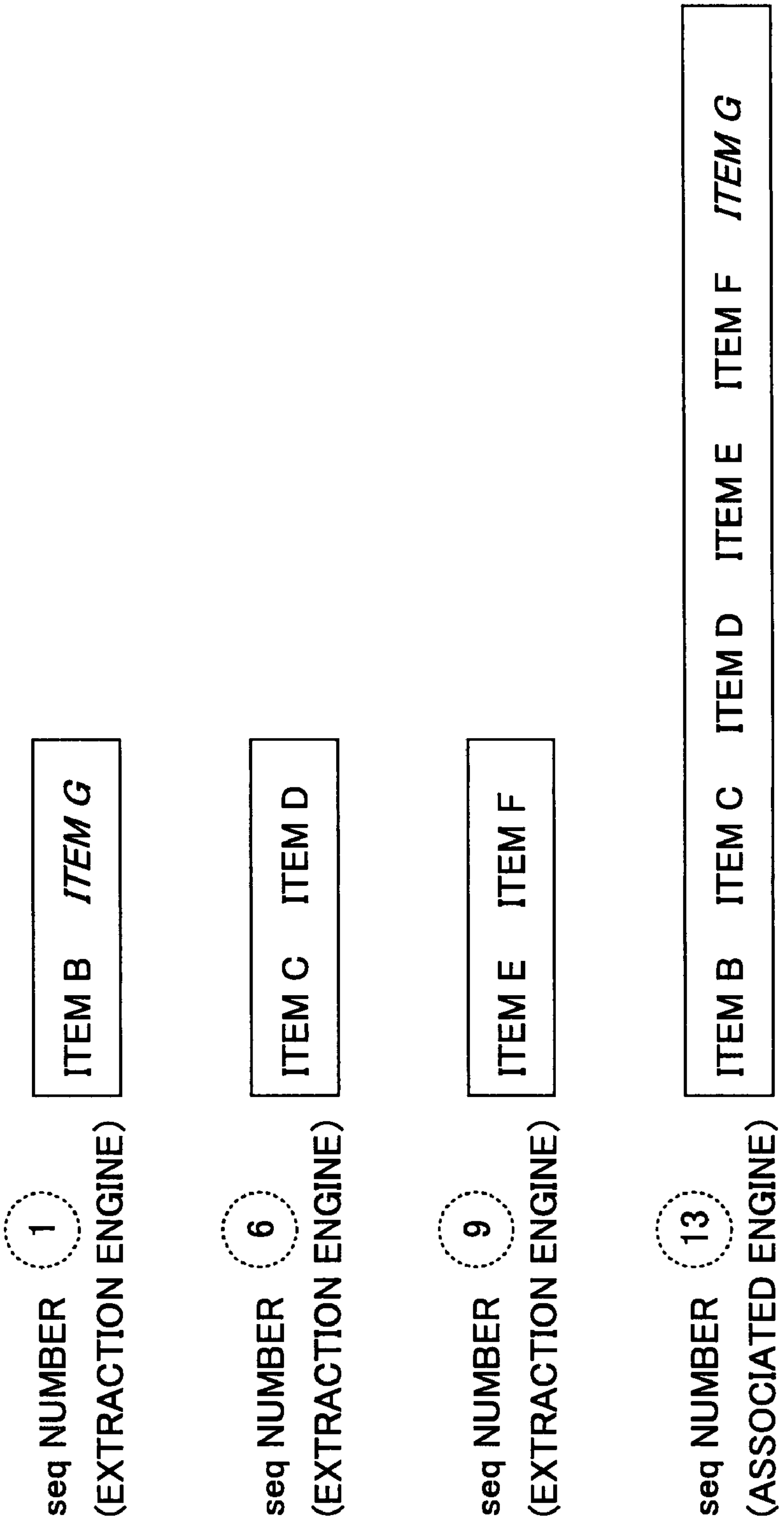
FIG. 12B is a conceptual diagram showing a state in which item inconsistency is eliminated, according to the embodiment of the present invention.

FIG. 12A is a conceptual diagram showing items set to the engine when the workflow is designed, according to the embodiment of the present invention. In FIG. 12A, for example, when the workflows 21 through 24 are arranged, an item A and an item B are set for an extraction engine of the sequential number 1 (as the "CSV IMPORT" engine), an item C and an item D are set for an extraction engine of the sequential number 6 (as the "MONITOR" engine), and an item E and an item F are set for an extraction engine of the sequential number 9 (as the "CSV IMPORT" engine). Also, the item A, the item B, the item C, the item D, the item E, and the item F are set for the associated engine (as the "MERGE" engine).

In this case, the user deletes the item A of the extraction engine (as the "CSV IMPORT" engine) of the sequential number 1, and adds an item G to the extraction engine (as the "CSV IMPORT" engine) of the sequential number 1. In this state, the item A, the item B, the item C, the item D, the item E, and the item F are described in the XML in the workflow design data 171. Thus, since the item A is deleted and the item G is added, the item inconsistency occurs due to the items of the association engine (as the "MERGE" engine) of the sequential number 13 when the association engine (as the "MERGE" engine) of the sequential number 13 is executed.

The workflow execution part 122 refers to the workflow design data 171 in order to execute the association engine (as the "MERGE" engine) of the sequential number 13, and checks whether or not the item A, the item B, the item C, the item D, the item E, and the item F exist in the workflow design data 171. In accordance with the data link lines defined in the workflow design data 171, the workflow execution part 122 tracks back to an original upper engine extracting data in an order of the data link lines L28, L11, and L13, in an order of the data link lines L27 and L24, and by the data link line L25 (refer to FIG. 11).

After that, the workflow execution part 122 acquires items again, and automatically updates XML descriptions to change current items of the association engine (as the "MERGE" engine) of the sequential number 13 to be the item B, the item C, the item D, the item E, the item F and the item G, so as to eliminate the item inconsistency.

FIG. 12B is a conceptual diagram showing a state in which the item inconsistency is eliminated, according to the embodiment of the present invention. In FIG. 12B, since the item A and the item B of the extraction engine (as the "MERGE" engine) of the sequential number 1 are changed to the item B and the item G, the item B, the item C, the item D, the item E, the item F, and the item G are set with respect to the extraction engine (as the "MERGE" engine) of the sequential number 13.

In the following, the XML descriptions automatically created and update in the workflow design data 171 will be described.

FIG. 13 is a diagram showing an example of the XML descriptions in the workflow design data in which the business flow defined on the matrix in FIG. 11 is described in the XML, according to the embodiment of the present invention. The workflow design data 171 shown in FIG. 13 is created and described in the XML for each business flow, and are maintained as a data file. The workflow design data 171 stores in the storage area 17 in the client PC 10*a*.

A header part of the workflow design data 171 includes information described prior to detail descriptions of the workflows forming the business flow. For example, regarding the business flow, the header part defines a business flow definition set, information for a description of a business flow name, information for a description of the number of rows in a business flow edit area, information for a description of a business flow group name, additional information when saving flow, information for a description of an author of the business flow, information for a description of an updated date of the business flow (yyyymmdd hhmmss format), information for a description of a comment (an explanation) of the business flow, and information for a description of an execution time of the business flow (hhmmss format). Moreover, regarding the workflow, the header part defines a workflow definition set, information for a description of a workflow name, information for a description of a workflow ID, information for a description of the number of rows in a workflow edit area, information for a description of the number of columns in the workflow edit area, information for a description of the arrangement location of the workflow, and information for a description of an execution time of the workflow (hh:mm:ss format) Furthermore, regarding the engine, the header part defines an engine definition set, information for a description of the execution time of the engine (hhmmss format), an entire set of engine link information, one set of the engine link information, a link originator engine ID, and a link destination engine ID.

For example, details of the workflows set to the business flow are described in the XML as shown in FIG. 14 through FIG. 17.

FIG. 14, FIG. 15, FIG. 16, and FIG. 17 are diagrams showing a description example of the workflows set to the business flow, according to the embodiment of the present invention. Descriptions shown in FIG. 14 through FIG. 17 are maintained after the header part shown in FIG. 13.

In FIG. 14 through FIG. 17, information concerning the business flow shown in FIG. 11 is defined by a description 301. A tag <businessflow> is used to define a group name and a maximum number of rows (rows="5") of the matrix 50*f* used for this business flow. The maximum number of rows indicates the number of the workflows. A tag <information> is used to define information concerning a creation of this business flow.

A description 320 defines information concerning the workflow 21. By a tag <workflow>, a maximum number columns (cols="4"), identification information (id="workflow.1") of the workflow 21, a name (name="WORKFLOW 21") of the workflow 21, an arrangement location (fposy="0") of the workflow 21 in the matrix 50*f*, the maximum number of rows (rows="1") in the workflow 21, the execution time (runtime="00:00:13"), and a like.

Subsequently, a description 322 defines the engine set as the "AGGREGATION" engine of the sequential number 3 in the workflow 21 by using a tag <engine>. Setting information concerning this "AGGREGATION" engine of the sequential number 3 is defined by using a plurality of tags <setting> as shown in a description 322*a* and a description 322*b*.

Similarly, a description 323 defines the engine set as the "TREND" engine of the sequential number 4 in the workflow 21. Setting information concerning this "TREND" engine of the sequential number 4 is defined by using a plurality of tags <setting> as shown in a description 323*a*, a description 323*b*, a description 323*c*, a description 323*d*, a description 323*e*, and a description 323*f*.

Similarly, a description 324 defines the engine set as the "AREA DIVISION" engine of the sequential number 2 in the workflow 21. Setting information concerning this "AREA DIVISION" engine of the sequential number 2 is defined by using a plurality of tags <setting> as shown in a description 324*a* and a description 324*b*.

Similarly, a description 324 defines the engine set as the "CSV IMPORT" engine of the sequential number 1 in the workflow 21. Setting information concerning this "CSV IMPORT" engine of the sequential number 1 is defined by using a plurality of tags <setting> as shown in a description 325*a* and a description 325*b*.

Next, a description 330 defines information concerning the workflow 22. By the tag <workflow>, the maximum number columns (cols="4"), the identification information (id="workflow.2") of the workflow 22, a name (name="WORKFLOW 22") of the workflow 22, an arrangement location (fposy="1") of the workflow 22 in the matrix 50*f*, the maximum number of rows (rows="2") in the workflow 22, the execution time (runtime="00:00:06"), and a like.

Subsequently, a description 332 defines the engine set as the "MONITOR" engine of the sequential number 6 in the workflow 22 by using a tag <engine>. Setting information concerning this "MONITOR" engine of the sequential number 6 is defined as shown in a description 332*a*.

Next, a description 340 defines information concerning the workflow 23. By the tag <workflow>, the maximum number columns (cols="5"), the identification information (id="workflow.3") of the workflow 23, a name (name="WORKFLOW 23") of the workflow 23, an arrangement location (fposy="2") of the workflow 23 in the matrix 50*f*, the maximum number of rows (rows="2") in the workflow 23, the execution time (runtime="00:00:01"), and a like.

Subsequently, a description 342 defines the engine set as the "MERGE" engine of the sequential number 16 in the workflow 24 by using the tag <engine>. Setting information concerning this "MERGE" engine of the sequential number 16 is defined as shown in a description 342*a*.

Next, a description 350 defines information concerning the workflow 24. By the tag <workflow>, the maximum number columns (cols="5"), the identification information (id="workflow.4") of the workflow 24, a name (name="WORKFLOW 24") of the workflow 24, an arrangement location (fposy="3") of the workflow 24 in the matrix 50*f*, the maximum number of rows (rows="2") in the workflow 24, the execution time (runtime="00:00:01"), and a like.

Subsequently, a description 352 defines the engine set as the "CORRELATION CHART" engine of the sequential number 17 in the workflow 24 by using the tag <engine>. Setting information concerning this "CORRELATION CHART" engine of the sequential number 17 is defined as shown in a description 352*a*.

A description 501 using a tag <link-set> defines the data link lines L11 through L34 arranged by the user shown in FIG. 11.

A description 511 using a tag <link> defines the data link line L11, and describes the data association from "workflow.21/process.areadivide.1" ("AREA DIVISION" engine of the sequential number 2 in the workflow 21) to "workflow.21/process.calculate.1" ("AGGERATION" engine of the sequential number 3 in the workflow 21) by using a tag <from> and a tag <to>.

A description 512 using the tag <link> defines the data link line L12, and describes the data association from "workflow.21/process.calculate.1" ("AGGERATION" engine of the sequential number 3 in the workflow 21) to "workflow.21/result.trend.1" ("TREND" engine of the sequential number 4 in the workflow 21) by using the tag <from> and the tag <to>.

A description 513 using the tag <link> defines the data link line L13, and describes the data association from "workflow.21/extract.import.1" ("CSV IMPORT" engine of the sequential number 1 in the workflow 21) to "workflow.21/process.areadivide.1" ("AREA DIVISION" engine of the sequential number 2 in the workflow 21) by using the tag <from> and the tag <to>.

A description 521 using the tag <link> defines the data link line L14, and describes the data association from "workflow.22/extract.lot.1" ("LOT" engine of the sequential number 5 in the workflow 22) to "workflow.22/extract.monitordata.2" ("MONITOR" engine of the sequential number 6 in the workflow 22) by using the tag <from> and the tag <to>.

A description 522 using the tag <link> defines the data link line L22, and describes the data association from "workflow.22/process.merge.3" ("MERGE" engine of the sequential number 10 in the workflow 22) to "workflow.22/result.trend.2" ("TREND" engine of the sequential number 6 in the workflow 22) by using the tag <from> and the tag <to>.

A description 523 using the tag <link> defines the data link line L23, and describes the data association from "workflow.22/result.trend.1" ("TREND" engine of the sequential number 7 in the workflow 22) to "workflow.22/result.export.1" ("CSV EXPORT" engine of the sequential number 8 in the workflow 22) by using the tag <from> and the tag <to>.

A description 524 using the tag <link> defines the data link line L24, and describes the data association from "workflow.22/extract.monitordata.2" ("MONITOR" engine of the sequential number 6 in the workflow 22) to "workflow.22/process.merge.3" ("MERGE" engine of the sequential number 10 in the workflow 22) by using the tag <from> and the tag <to>.

A description 525 using the tag <link> defines the data link line L25, and describes the data association from "workflow.22/extract.import.4" ("CSV IMPORT" engine of the sequential number 9 in the workflow 22) to "workflow.22/process.merge.3" ("MERGE" engine of the sequential number 10 in the workflow 22) by using the tag <from> and the tag <to>.

A description 526 using the tag <link> defines the data link line L26, and describes the data association from "workflow.22/extract.monitordata.2" ("MONITOR" engine of the sequential number 6 in the workflow 22) to "workflow.22/result.trend.1" ("TREND" engine of the sequential number 7 in the workflow 22) by using the tag <from> and the tag <to>.

A description 527 using the tag <link> defines the data link line L27, and describes the data association from "workflow.22/process.merge.3" ("MERGE" engine of the sequential number 10 in the workflow 22) to "workflow.23/process-.merge.2" ("MERGE" engine of the sequential number 13 in the workflow 23) by using the tag <from> and the tag <to>. The description 527 of the data link line L27 defines the data association toward another workflow 23.

A description 528 using the tag <link> defines the data link line L28, and describes the data association from "workflow.21/process.calculate.1" ("AGGREGATION" engine of the sequential number 3 in the workflow 22) to "workflow.23/process.merge.2" ("MERGE" engine of the sequential number 13 in the workflow 23) by using the tag <from> and the tag <to>. The description 528 of the data link line L28 defines the data association toward another workflow 23.

A description 529 using the tag <link> defines the data link line L29, and describes the data association from "workflow.23/process.merge.2" ("MERGE" engine of the sequential number 10 in the workflow 22) to "workflow.23/result.trend.2" ("TREND" engine of the sequential number 14 in the workflow 23) by using the tag <from> and the tag <to>.

A description 530 using the tag <link> defines the data link line L30, and describes the data association from "workflow.23/process.merge.2" ("MERGE" engine of the sequential number 14 in the workflow 23) to "workflow.23/result.xyplot.1" ("CORRELATION CHART" engine of the sequential number 15 in the workflow 23) by using the tag <from> and the tag <to>.

A description 531 using the tag <link> defines the data link line L31, and describes the data association from "workflow.22/extract.lot.1" ("LOT" of the sequential number 5 in the workflow 23) to "workflow.23/extract.processdata.1" ("PROCESS" engine of the sequential number 12 in the workflow 23) by using the tag <from> and the tag <to>. The description 531 of the data link line L31 defines the data association toward another workflow 23.

A description 532 using the tag <link> defines the data link line L32, and describes the data association from "workflow.24/process.merge.1" ("MERGE" engine of the sequential number 16 in the workflow 24) to "workflow.24/result.xyplot.1" ("CORRELATION CHART" engine of the sequential number 17 in the workflow 24) by using the tag <from> and the tag <to>.

A description 533 using the tag <link> defines the data link line L33, and describes the data association from "workflow.23/extract.processdata.1" ("PROCESS" engine of the sequential number 12 in the workflow 23) to "workflow.24/process.merge.1" ("MERGE" engine of the sequential number 16 in the workflow 24) by using the tag <from> and the tag <to>. The description 533 of the data link line L33 defines the data association toward another workflow 24.

A description 534 using the tag <link> defines the data link line L34, and describes the data association from "workflow.23/process.merge.2" ("MERGE" engine of the sequential number 13 in the workflow 23) to "workflow.24/process.merge.1" ("MERGE" engine of the sequential number 16 in the workflow 24) by using the tag <from> and the tag <to>. The description 534 of the data link line L34 defines the data association toward another workflow 24.

In the workflow 21, the engines are arranged in an order of the "CSV IMPORT" engine, the "AREA DIVISION" engine, the "AGGREGATION" engine, and the "TREND" engine. However, since the user flexibly places those engines in accordance with the cognitive thought process of the user, a setting order in which the user places the engines may not be the same as an arrangement order. Also, in the workflow 22 through the workflow 24, the setting orders by the user may not be the same as the arrangement orders.

The workflow design data 171 shown in FIG. 14 through FIG. 17 allows flexible definitions in accordance with the cognitive thought process of the user. Accordingly, the definitions can be described irrelevantly to the setting order in which the user places the engines and also data link lines.

As described above, the workflow design data 171 include various setting information such as an extraction condition, an analysis result, and a like by settings (tags <setting>) of the engines. Therefore, the user can flexibly place the engines and the data link lines based on the cognitive thought process of the user. By various setting information, it is possible to realize the data associations from one or more engines to one engine and the data associations from one engine to one or more engines.

The workflow execution part 122 executed by the CPU of the client PC 10*a* refers to the workflow design data 171 described in the XML when executing the business flow and the workflow. The workflow execution part 122 sequentially conducts the engines in accordance with the description 501 defining the data associations, and performs the business flow and the workflows while verifying the setting information (tags <setting>) capable of associating data among the engines for a next engine. The workflow execution part 122 appropriately sends a notice of the execution state to the workflow execution management part 112 of the quality improvement support server 100.

Figure 18:
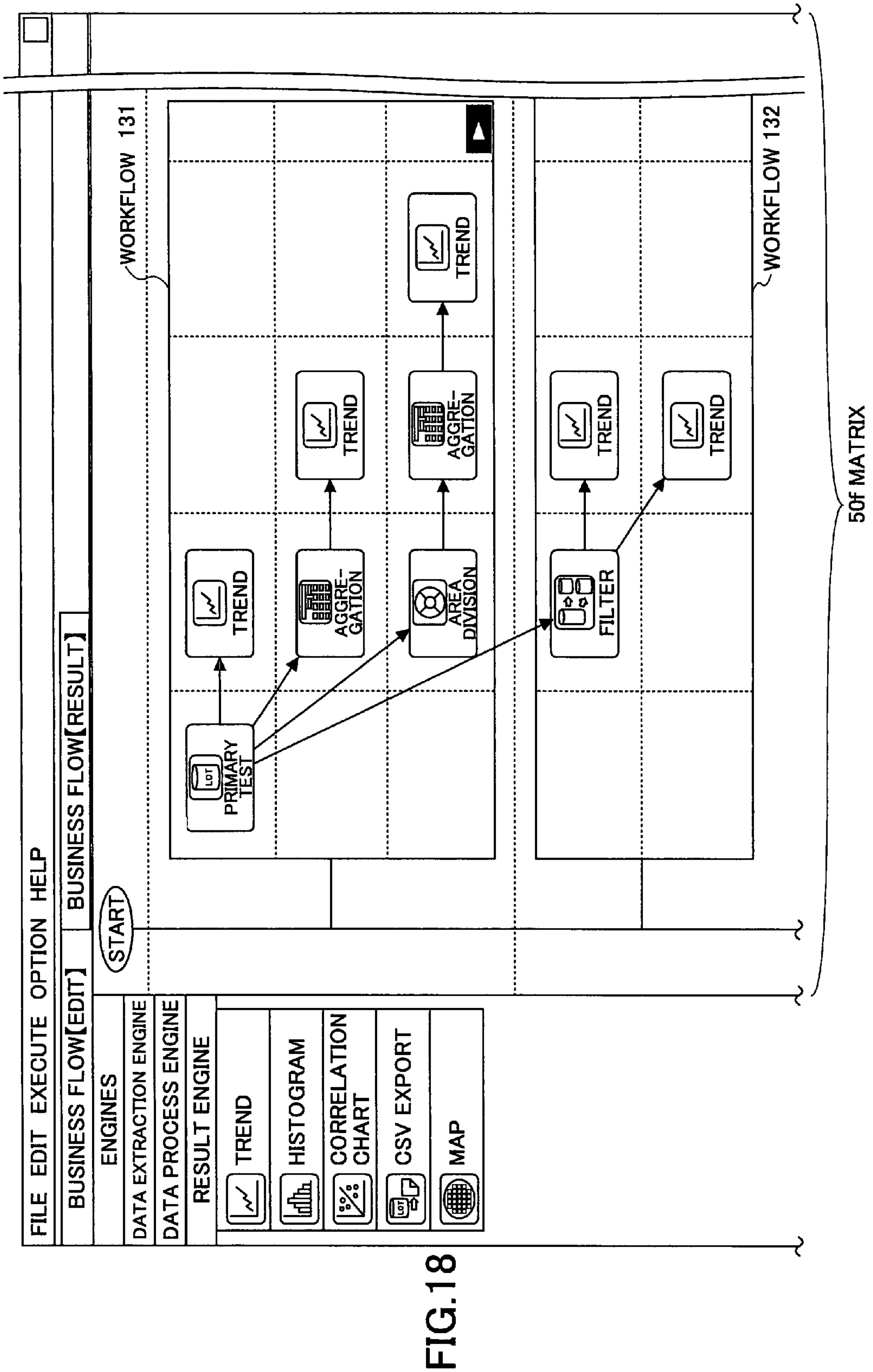
FIG. 18 is a diagram showing a third example of the workflow design of the matrix according to the present invention.

FIG. 18 is a diagram showing a third example of the workflow design of the matrix according to the present invention. In the third example of the workflow design, a workflow 131, a workflow 132 . . . are arranged on the matrix 50*f* as one business flow.

In the workflow 131, the data associations are set from a "PRIMARY TEST" engine to a plurality of engines: a "TREND" engine, a "AGGREGATION" engine, and an "AREA DIVISION" engine. In addition, the data association is set from the "PRIMARY TEST" engine in the workflow 131 to a "FILTER" engine in the workflow 132.

In the third example in FIG. 18, a single data extraction result of the "PRIMARY TEST" engine is associated with one graph process and three types of processes. One of the three processes further conducts a process, and produces a graph indicating a final result. By associating a process result among the engines being the program icon to be processed for a next engine being the program icon, it is possible to realize data process in accordance with the cognitive though process of the user.

A plurality of setting information are automatically modified in the workflow design data by corresponding to requirements of the "TREND" engine, the "AGGREGATION" engine, the "AREA DIVISION" engine, and the "FILTER" engine. Therefore, it is possible to flexibly execute the business flow and the workflow in response to the cognitive thought process of the user.

The setting information to be set for branches for the engines is information indicating a number, a character, a term, a tendency, and a like. Moreover, the information indicating a number, a character, a term, a tendency, and a like can be defined as condition settings. Furthermore, the setting information can be set freely by the user as an engineer of the client PC 10*a* or by an administrator of the quality improvement system 1000 to avoid complication of the settings.

In the present invention, first, the extraction condition and the analysis result are associated among various engines in the workflow design. Therefore, it is possible to realize an automated drilldown analysis since the extraction, the filter condition, and the analysis result set for the engine at a previous state are flexibly passed to a next engine.

Second, a condition branch, a classification, a filter engine separated from a data type and an analysis engine are provided so as to correspond to various branches of the data associations. Therefore, it is possible for the user to design the workflow in the cognitive thought process of the user.

Therefore, it is possible to realize the workflow design in accordance with the cognitive thought process of the user and the automated drilldown based on a determination of the user. Accordingly, it is possible to improve accuracy based on a decision of the user and to reduce time consumption.

According to the present invention, an analysis method of the user as the engineer, which becomes complicate in a process of the quality improvement, can be systemized. Also, it is possible to configure a knowledge system integrating a considerable amount of engineer's knowledge. That is, a quality improvement method, which conventionally has depended on each of the engineers, has not been shared with, and has become implicit, can be uniformed among all engineers. As a result, it is possible to reduce duplication of an analysis operation of each of the engineers and make the analysis operation effective. Also, it is possible to uniform a skill level among the engineers, and effectively use resources (for example, a analysis time, manpower, and a like) of the engineers.

First, it is possible to realize an effective operation of the analysis. In the present invention, it is possible to automate a pre-stage process and an intermediate process for the analysis, and each of the engineers can concentrate considering the analysis alone. It is possible to uniform the skill level among the engineers and to reduce the analysis time. In addition, by reducing the analysis time, the engineers are allowed to spend time for another analysis from a different viewpoint, and can sufficiently use the resources for the analysis.

Second, it is possible to effectively correspond to the problem. In the present invention, the workflow execution management part 112 of the quality improvement support server 100 automatically diagnoses problems of the process and the device at the quality improvement support server 100. When detecting the existing problem which has been classified to a predetermined problem pattern, the workflow execution management part 112 automatically makes an instruction. On the other hand, when detecting a new problem, the workflow execution management part 112 automatically sends an alarm to the client PC 10*a* to inform the problem to the engineer using the client PC 10*a*. Accordingly, the engineer can be informed by a new alarm and can concentrate on the new problem only. It is possible to effectively use resources of a lot of the semiconductor and the device fabricating the semiconductor, and also effectively use the resource of the engineers (the analysis time, the manpower, and the like).

Third, it is possible to effectively conduct an analysis feedback. According to the present invention, the workflow design data can be repeatedly used. Thus, it is possible to effectively use experienced correspondences with respect to past problems, and to eliminate duplication of unnecessary analysis, so as to promptly feedback to a current analysis.

The present invention is not limited to the specifically disclosed embodiments, and variations and modifications may be made without departing from the scope of the invention.

The present application is based on Japanese Priority Application No. 2006-333710 filed Dec. 11, 2006, the entire contents of which are hereby incorporated by reference.

What is claimed is:

1. An information processing terminal for supporting quality improvement concerning product manufacture, the information processing terminal comprising:

a processor; and a storage area to store workflow design data for arranging a plurality of workflows in a matrix and flow control data indicating an execution order in the matrix;

wherein the processor includes:

a workflow arrangement part configured to arrange the plurality of workflows in the matrix based on row information indicating a first arrangement location of each of the plurality of workflows acquired from the workflow design data stored in the storage area, and display the plurality of workflows in the matrix;

a process component arrangement part configured to arrange each of a plurality of process components based on row and column information indicating a second arrangement location of each of the plurality of process components in each of the plurality of workflows acquired from the workflow design data stored in the storage area, and display the plurality of process components in the matrix;

a data association part configured to perform a data association among the plurality of process components in accordance with data link lines defined by the workflow design data stored in the storage area within each of the plurality of workflows or the data link lines crossing from one workflow to another workflow with respect to the plurality of process components arranged and displayed in the plurality of workflows; and an execution part configured to execute the plurality of process components in accordance with the execution order indicated by the flow control data to verify a quality improvement, wherein in response to deleting or adding an item with respect to one of the plurality of process components in the matrix, the execution part eliminates an item inconsistency related to an association process component associated with multiple process components being data association originators by:

tracking back to original upper process components in accordance with the data link lines in the workflow design data, and acquiring items of the association process component.

2. The information processing terminal as claimed in claim 1, wherein the data association part performs the data association from one process component being a data association originator to a plurality of other process components being data association destinations.

3. The information processing terminal as claimed in claim 1, wherein the storage area further stores a quality management data file for data concerning a production;

at least one of the plurality of process components extracts data corresponding to items set by the user from the quality management data file stored in the storage area; and the data association part performs the data association from multiple process components to the association process component being a data association destination.

4. The information processing terminal as claimed in claim 1, wherein the row information of each of the plurality of workflows, the row and column information of each of the plurality of process components within the plurality of workflows, and data association information indicating each of the data associations among the plurality of process components are described in a metadata language for each business flow formed by the plurality of workflows and maintained in the workflow design data.

5. The information processing terminal as claimed in claim 4, the execution part executes the plurality of process components being arranged in the plurality of workflows in units of one business flow or one workflow.

6. The information processing terminal as claimed in claim 5, wherein program data including a program functioning as the workflow arrangement part, the process component arrangement part, the data association part, and the execution part are downloaded from a server.

7. The information processing terminal as claimed in claim 1, wherein a coordinate in a fourth quadrant is applied so as to flow a process in a lateral direction from left to right and in a longitudinal direction from upper to lower.

8. A method performed in a computer, the method comprising:

arranging, by the computer, a plurality of workflows in a matrix based on row information indicating a first arrangement location of each of the plurality of workflows acquired from workflow design data stored in a storage area, and displaying the plurality of workflows in the matrix;

arranging, by the computer, each of a plurality of process components based on row and column information indicating a second arrangement location of each of the plurality of process components in each of the plurality of workflows acquired from the workflow design data stored in the storage area, and displaying the plurality of process components based on the matrix information in the matrix;

performing, by the computer, a data association among the plurality of process components in accordance with data link lines defined by the workflow design data stored in the storage area within each of the plurality of workflows or the data link lines crossing from one workflow to another workflow with respect to the plurality of process components arranged and displayed in the plurality of workflows; and executing, by the computer, the plurality of process components in accordance with an execution order indicated b flow control data stored in the storage area to verify a quality improvement, wherein, in response to deleting or adding an item with respect to one of the plurality of process components in the matrix, the execution part eliminates an item inconsistency related to an association process component associated with multiple process components being data association originators by:

tracking back to original upper process components in accordance with the data link lines in the workflow design data, and acquiring items of the association process component.

9. A non-transitory computer-readable recording medium recorded with a computer program which, when executed by a computer, causes the computer to support quality improvement concerning a product manufacture, said computer program comprising codes for:

arranging a plurality of workflows in a matrix based on row information indicating a first arrangement location of each of the plurality of workflows acquired from workflow design data stored in a storage area being arranged in an area, and displaying the plurality of workflows in the matrix;

arranging each of a plurality of process components based on row and column information indicating a second arrangement location of each of the plurality of process components in each of the plurality of workflows acquired from the workflow design data stored in the storage area, and displaying the plurality of process components in the matrix;

performing a data association among the plurality of process components in accordance with data link lines defined by the workflow design data stored in the storage area within each of the plurality of workflows or the data link lines crossing from one workflow to another workflow with respect to the plurality of process components arranged and displayed in the plurality of workflows; and executing the plurality of process components in accordance with an execution order indicated by flow control data stored in the storage area to verify a quality improvement, wherein, in response to deleting or adding an item with respect to one of the plurality of process components in the matrix, the execution part eliminates an item inconsistency related to an association process component associated with multiple process components being data association originators by:

tracking back to original upper process components in accordance with the data link lines in the workflow design data, and acquiring items of the association process component.

10. A server for supporting quality improvement concerning a production manufacture, the server comprising:

a processor; and a storage unit;

wherein the storage unit stores:

a first program as a workflow arrangement part configured to acquiring arrange a plurality of workflows in a matrix based on row information indicating a first arrangement location of each of the plurality of workflows acquired from workflow design data stored in a storage area, and display the plurality of workflows in the matrix;

a second program as a process component arrangement part configured to arrange each of a plurality of process components based on row and column information indicating a second arrangement location of each of the plurality of process components in each of the plurality of workflows, and display the plurality of process components in the matrix;

a third program as a data association part configured to perform a data association among the plurality of process components in accordance with data link lines defined by the workflow design data stored in the storage area within each of the plurality of workflows or the data link lines crossing from one workflow to another workflow with respect to the plurality of process components arranged and displayed in the plurality of workflows; and a fourth program as an execution part configured to execute the plurality of process components in accordance with an execution order indicated by flow control data stored in the storage area to verify a quality improvement, wherein, in response to deleting or adding an item with respect to one of the plurality of process components in the matrix, the execution part eliminates an item inconsistency related to an association process component associated with multiple process components being data association originators by:

tracking back to original upper process components in accordance with the data link lines in the workflow design data, and acquiring items of the association process component, and the processor includes a sending part configured to send program data including the first program, the second program, the third program, and the fourth program, to an information processing terminal connected through a network.

11. The server as claimed in claim 10, wherein the storage unit further stores a problem database maintaining information of existing problems and an instruction detail of each of existing problems; and the processor includes a problem correspondence part configured to receive a notice of a problem in executing one of the workflow arrangement part, the process component arrangement part, the data association part, and the execution part at the information processing terminal, and to send the instruction detail corresponding to the problem being received by referring to the problem database.

* * * * *